US009114828B2

(12) United States Patent
Fujiwara et al.

(10) Patent No.: US 9,114,828 B2
(45) Date of Patent: Aug. 25, 2015

(54) TELESCOPIC STEERING APPARATUS

(75) Inventors: Takeshi Fujiwara, Gunma (JP); Toru Segawa, Gunma (JP); Takahiro Minamigata, Gunma (JP); Kiyoshi Sadakata, Gunma (JP)

(73) Assignee: NSK. Ltd., Tokyo (JP)

( * ) Notice: Subject to any disclaimer, the term of this patent is extended or adjusted under 35 U.S.C. 154(b) by 0 days.

(21) Appl. No.: 14/347,639

(22) PCT Filed: Aug. 27, 2012

(86) PCT No.: PCT/JP2012/071566
§ 371 (c)(1),
(2), (4) Date: Jul. 7, 2014

(87) PCT Pub. No.: WO2013/047048
PCT Pub. Date: Apr. 4, 2013

(65) Prior Publication Data
US 2014/0331811 A1    Nov. 13, 2014

(30) Foreign Application Priority Data

Sep. 29, 2011    (JP) ................................ 2011-214698
Oct. 11, 2011    (JP) ................................ 2011-223816

(51) Int. Cl.
*B62D 1/18*        (2006.01)
*B62D 1/185*      (2006.01)
*B62D 1/184*      (2006.01)

(52) U.S. Cl.
CPC ................ *B62D 1/185* (2013.01); *B62D 1/184* (2013.01)

(58) Field of Classification Search
CPC ......... B62D 1/184; B62D 1/185; B62D 1/187
USPC ............................................ 280/775; 74/493
See application file for complete search history.

(56) References Cited

U.S. PATENT DOCUMENTS 5,655,413 A *   8/1997   Barton ............................. 74/493
7,011,340 B2 *   3/2006   Tsuji et al. ..................... 280/775
(Continued)

FOREIGN PATENT DOCUMENTS

JP         59-47574 U     3/1984
JP         59-142172 U    9/1984
(Continued)

OTHER PUBLICATIONS

Tokioka et al., Steering Device, Aug. 19, 2004, JPO, JP 2004-231114 A. Machine Translation of Description.*
(Continued)

*Primary Examiner* — James English
(74) *Attorney, Agent, or Firm* — Miles & Stockbridge P.C.

(57) ABSTRACT

When adjusting the forward-backward position of a steering wheel, together with reducing any uncomfortable feeling experienced by the driver, a support bracket is prevented from breaking away toward the front due to an extremely large force applied during the adjustment operation. Elastic sleeves 35 are mounted inside the long holes 25*a* in the forward-backward direction, and an adjustment rod 19*a* is inserted through the inside of the elastic sleeves 35. Gaps 36 located between the outer circumferential surface of both end portions in the forward-backward direction of the elastic sleeves 35 and the inner circumferential surface of the both end portions in the forward-backward direction of the long holes 25*a* in the forward-backward direction. When adjusting the forward-backward position the steering wheel, the adjustment rod 19*a* forcibly displaces toward the end portions in the forward-backward direction of the long holes 25*a* in the forward-backward direction, and when forcibly colliding with the inner circumferential surface of the end portions in the forward-backward direction of the elastic sleeves 35, the gaps 36 reduce the impact that is applied to the inner circumferential surface of the end portions of the long holes 25*a* in the forward-backward direction from the adjustment rod 19*a* by increasing the amount that the end portions of the elastic sleeves 35 elastically deform.

8 Claims, 18 Drawing Sheets

(56) References Cited

U.S. PATENT DOCUMENTS

| | | | |
|---|---|---|---|
| 2009/0044657 A1* | 2/2009 | Osawa et al. | 74/493 |
| 2012/0312117 A1* | 12/2012 | Maniwa | 74/493 |

FOREIGN PATENT DOCUMENTS

| | | | |
|---|---|---|---|
| JP | 62-139779 U | | 9/1987 |
| JP | 64-55531 U | | 4/1989 |
| JP | 08-312636 A | | 11/1996 |
| JP | 10-512825 A | | 12/1998 |
| JP | 2001-027256 A | | 1/2001 |
| JP | 2001-322552 A | | 11/2001 |
| JP | 2004-075053 A | | 3/2004 |
| JP | 2004231114 A | * | 8/2004 |
| JP | 2005-156106 A | | 6/2005 |
| JP | 2006-240327 A | | 9/2006 |
| JP | 2009-045992 A | | 3/2009 |
| JP | 2011-140261 A | | 7/2011 |

OTHER PUBLICATIONS

Arakawa et al., Steering Device, Jul. 21, 2011, JPO, JP 2011-140261 A. Machine Translation of Description.*

International Search Report from International Patent Application No. PCT/JP2012/071566, Nov. 20, 2012.

Office Action issued Dec. 25, 2013 in Japanese Patent Application No. 2011-214698.

Office Action issued Dec. 25, 2013 in Japanese Patent Application No. 2011-223816.

Office Action issued Jan. 7, 2014, in Japanese Patent Application No. 2011-223816.

* cited by examiner

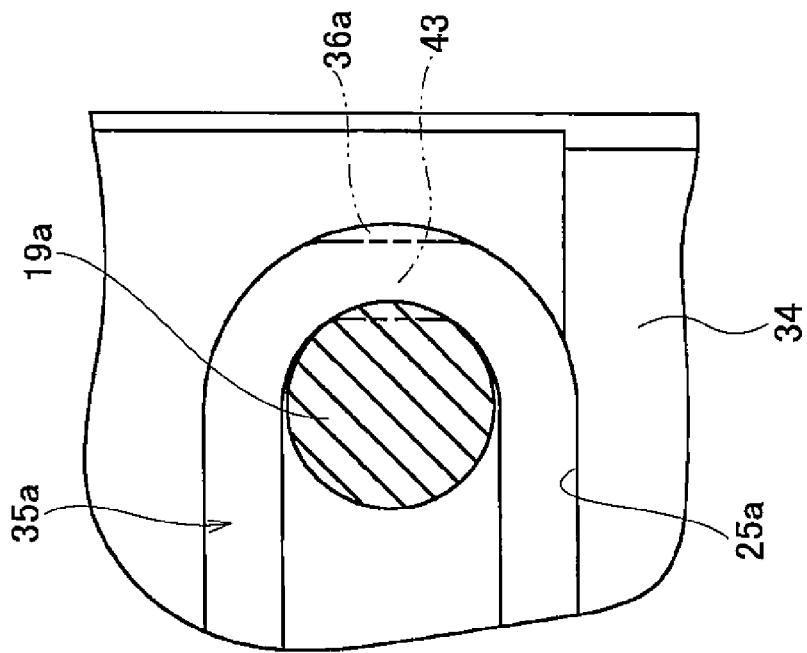
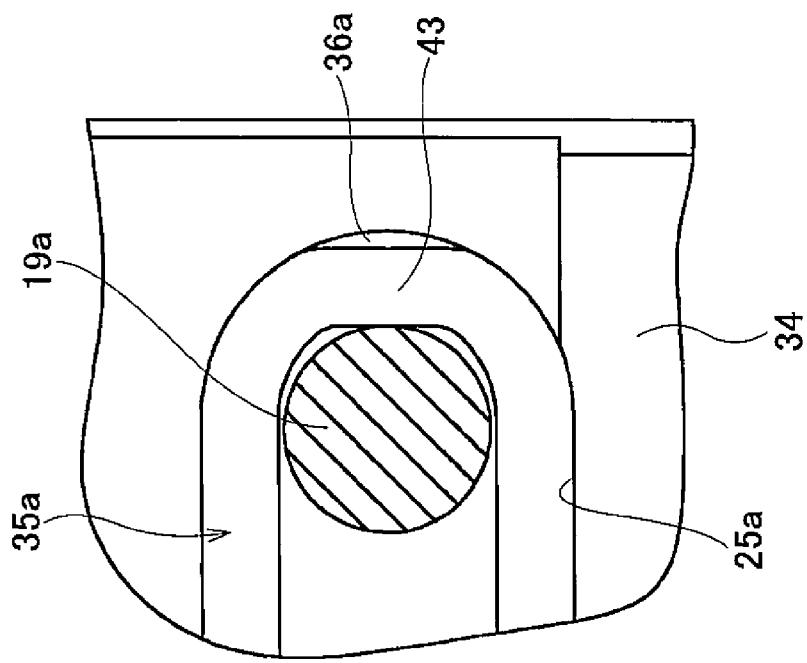

TELESCOPIC STEERING APPARATUS

TECHNICAL FIELD

The present invention relates to the improvement of a telescopic steering apparatus for adjusting the forward-backward position of a steering wheel.

BACKGROUND ART

FIG. 18 illustrates a conventional example of a steering apparatus for an automobile. The steering apparatus is constructed so that rotation of a steering wheel 1 is transmitted to an input shaft 3 of a steering gear unit 2, and as the input shaft 3 is rotated, a pair of left and right tie rods 4 are pushed or pulled, which applies a steering angle to the front wheels. The steering wheel 1 is supported by and fastened to the rear end portion of a steering shaft 5, and the steering shaft 5 is inserted in the axial direction through a cylindrical steering column 6, and is supported by this steering column 6 so as to be able to rotate freely. Moreover, the front end portion of the steering shaft 5 is connected to the rear end portion of an intermediate shaft 8 by way of a universal joint 7, and the front end portion of the intermediate shaft 8 is connected to the input shaft 3 by way of another universal joint 9.

As a steering apparatus, construction is widely used that has a tilt mechanism for adjusting the up-down position of the steering wheel 1, and a telescopic mechanism for adjusting the forward-backward position of the steering wheel 1 according to the physique or posture of the driver. In order to construct the tilt mechanism, the steering column 6 is supported by a vehicle body 10 so as to be able to pivotally displace around a pivot shaft 11 that is arranged in the width direction. Moreover, a displacement bracket that is fastened to the portion near the rear end of the steering column 6 is supported by a support bracket 12 that is supported by the vehicle body 10 so as to be able to displace in the up-down direction and the forward-backward direction. Here, the width direction is the width direction of the vehicle body, and is also the left-right direction. The forward-backward direction is the forward-backward direction of the vehicle body.

On the other hand, in order to construct the telescopic mechanism that enables displacement in the forward-backward direction, the steering column 6 is constructed by telescopically combining an outer column 13 and an inner column 14 so as to be able to extend and contract freely, and the steering shaft 5 is constructed by combining an outer shaft 15 and an inner shaft 16 by a spline fit and the like, so as to be able to transmit torque freely, and extend and contract freely. In the example in the figure, an electric power-steering apparatus, having an electric motor 17 as an auxiliary power source, is also assembled in order to reduce the force necessary for operating the steering wheel 1.

The tilt mechanism or telescopic mechanism can be constructed so as to switch a state in which the position of the steering wheel 1 can be adjusted and a state after adjustment in which the steering wheel is secured by operating an adjustment handle, except for electric tilt mechanism or electric telescopic mechanism. FIG. 19 and FIG. 20 illustrate an example of conventional construction as disclosed in JP 2001-322552 (A). In this conventional construction, as the adjustment handle 18 rotates an adjustment rod 19, the dimension in the axial direction of a cam apparatus 20 is caused to expand or contract, and at the same time a cam member 21 is caused to pivotally displace, such that based on this expansion or contraction of the cam apparatus 20, the displacement bracket 22 that is fastened to the outer column 13a is caused to engage or disengage with a support bracket 12a. Moreover, based on the pivotal displacement of the cam member 21, the state of the inner column 14a is switched to being able or not being able to slide with respect to the outer column 13a.

The adjustment rod 19 is inserted in the width direction through long holes 24 in the up-down direction that are formed in a pair of left and right support plate portions 23 of the support bracket 12a, and through long holes 25 in the forward-backward direction that are formed in the displacement bracket 22. When adjusting the up-down position or the forward-backward position of the steering wheel 1 (see FIG. 18) that is supported by and fastened to the rear end portion of the steering shaft 5a, the adjustment handle 18 is rotated in a specified direction (normally downward), which, together with reducing the dimension in the axial direction of the cam apparatus 20, causes the cam member 21 to separate from the outer circumferential surface of the inner column 14a. In this state, the up-down position and the forward-backward position of the steering wheel 1 can be adjusted within the range that the adjustment rod 19 can displace inside the long holes 24 in the up-down direction and inside the long holes 25 in the forward-backward direction. After the steering wheel 1 has been moved to a desired position, the adjustment handle 18 is rotated in the direction opposite to the specified direction (normally upward), which, together with expanding the dimension in the axial direction of the cam apparatus 20, presses the outer circumferential surface of the inner column 14a by the cam member 21. As a result, the steering wheel 1 is held in the adjusted position.

When adjusting the position of the steering wheel 1, as the steering wheel 1 is forcibly moved to the adjustable limit position, the adjustment rod 19 or the outer circumferential surface of sleeves 26a, 26b that are fit around the outside of the adjustment rod 19 forcibly hit one of the end portions of the long holes 24 in the up-down direction and long holes 25 in the forward-backward direction. As a result, impact is applied to the arms of the driver operating the steering wheel 1, which causes the driver to be uncomfortable and have a feeling that something is wrong. Furthermore, when forcibly causing the steering wheel 1 to displace all the way forward with an extremely large force, there is a possibility that the force for supporting the steering column 6a by the vehicle body will be lost. This point will be explained below.

During a collision accident, after a primary collision in which the automobile collides with another automobile, a secondary collision in which the driver's body collides with the steering wheel 1 occurs. During this secondary collision, in order to reduce the impact that is applied to the driver's body, the support bracket 12a is supported by the vehicle body 10 (see FIG. 18) so as to be able to break away toward the front when a large impact load is applied. On the other hand, when the steering wheel 1 is forcibly caused to displace to the very front position, and the rear end portions of the long holes 25 in the forward-backward direction are caused to forcibly collide against the outer circumferential surface of the sleeves 26a, 26b that are fitted around the adjustment rod 19, impact is applied to the support bracket 12a by way of the displacement bracket 22 in the same direction as the impact load that is applied during a secondary collision. Therefore, if the driver displaces the steering wheel 1 in the forward direction with an extremely large force when adjusting the forward-backward position of the steering wheel 1, there is a possibility that the support bracket 12a will break away in the forward direction. In the case that the support bracket 12a breaks away, operation of the steering wheel 1 becomes difficult.

In JPH 10-512825 (A), construction is disclosed in which an elastic block made using an elastomer is located at both end portions in the lengthwise direction of the inner circumferential surface of a plastic liner that corresponds to the long holes in the forward-backward direction. In the case of this kind of improved construction, it is thought that, together with being able to reduce a feeling that something is wrong that is felt by the driver when performing adjustment, it is possible to a certain extent to prevent the occurrence of problems due to performing adjustment using an extremely large force. However, in the case of the construction disclosed in JPH 10-512825 (A), the plastic liners and elastic blocks, which are separate from each other, are combined using adhesive or the like, so assembly is troublesome and the cost increases. Moreover, maintaining the amount of elastic deformation of the elastic blocks (elastic deformation stroke when absorbing impact) is not always performed sufficiently, so the effect of decreasing the feeling that something is wrong or the effect of preventing the occurrence of malfunction cannot always be sufficiently obtained.

RELATED LITERATURE

Patent Literature

[Patent Literature 1] JP 2001-322552 (A)
[Patent Literature 2] JPH 10-512825 (A)

SUMMARY OF INVENTION

Problem to be Solved by Invention

Taking into consideration the situation above, the object of the present invention is to provide construction that is able to further improve the effect of reducing any bad feeling that something is wrong, which is experienced by the driver during adjustment work, and the effect of preventing the occurrence of malfunction due to performing the adjustment operation with an extremely large force.

Means for Solving Problems

The telescopic steering apparatus of the present invention has a steering column, a displacement bracket, an elastic sleeve, a steering shaft, a support bracket, an adjustment rod, and an expansion and contraction mechanism. The steering column is cylindrical, and has an outer column, the inner diameter of at least one end portion in the axial direction thereof being able to expand or contract, and an inner column that is fitted inside and is supported by the inner diameter side of the outer column so as to be able to displace in the axial direction, that are combined so as to be able to extend and contract.

Moreover, the displacement bracket is fastened to one of the outer column and the inner column that is located on the rear side and displaces in the axial direction together with the one column as the steering wheel is moved forward or backward. The displacement bracket also has a long hole in the forward-backward direction that extends in the axial direction of the one column.

Moreover, the elastic sleeve is made of an elastic material such as elastomer like rubber, vinyl and the like, or a plastic material such as a plastomer like polypropylene (PP), polyacetal (POM) and the like, and is mounted inside the long hole in the forward-backward direction. The elastic sleeve is a member that is used for reducing impact by elastically deforming. Therefore, it is possible to use a plastomer as the material of the elastic sleeve, however, it is preferable an elastomer that more easily deforms plastically than a plastomer, and has excellent impact absorbing performance due to that elastic deformation.

The steering shaft is supported on the inner diameter side of the steering column so as to be able to rotate freely, and the steering wheel is fastened to the portion thereof that protrudes toward the rear further than the opening on the rear end side of the steering column. This steering shaft is supported on the inside of the one column so as to be able to rotate freely, and displaces in the axial direction with the one column. When the steering shaft is constructed as a combination of an outer shaft and an inner shaft so as to be able to transmit torque and extend and contract, the steering wheel is fastened to the rear end portion of one of either the outer shaft or the inner shaft (shaft on the rear side), and the one shaft is supported on the inside of the one column so as to be able to rotate freely, and displaces in the axial direction with the one column.

The support bracket supports the steering column with respect to the vehicle body such that forward-backward position of the steering wheel can be adjusted, and has a pair of support plate portions that are located on both sides in the width direction of the displacement bracket, and a pair of through holes that are formed in portions of these support plate portions that are aligned with each other.

The adjustment rod is inserted in the width direction of the displacement bracket through the through holes and the elastic sleeve that is mounted inside the long hole in the forward-backward direction.

Furthermore, the expansion and contraction mechanism expands or contacts a space between the inside surfaces of the support plate portions by expanding or contracting a space between a pair of pressure portions that are provided in portions on both end portions of the adjustment rod that face the outside surfaces of the support plate portions.

In the case of a first embodiment of the present invention, a gap is provided between the inner circumferential surface of the long hole in the forward-backward direction and the outer circumferential surface of the elastic sleeve, at least at one end portion where the adjustment rod is located with the entire length of the steering column contracted in order to move the forward-backward position of the steering wheel to the most forward adjustable position, of both forward and backward end portions of the long hole in the forward-backward direction and the elastic sleeve. The gap functions to reduce the impact that is applied to the adjustment rod from the inner circumferential surface of the one end portion of the long hole in the forward-backward direction by increasing the amount of elastic deformation of the elastic sleeve when the adjustment rod forcibly collides with the inner circumferential surface of the one end portion of the elastic sleeve.

In this case, the outer column is located on the rear side, the inner column is located on the front side, and the one column is the outer column; a slit that extends in the axial direction is formed in the front end portion of this outer column such that the inner diameter of this outer column can elastically expand and contract; the displacement bracket has a pair of held plate portions that are fastened to the outer circumferential surface of the outer column on both sides of the slit, and the long hole in the forward-backward direction is formed in this held plate portions; the one end portion is the rear end portion; and the gap is provided between at least the inner circumferential surface on the rear end portion of the long hole in the forward-backward direction and the outer circumferential surface of the rear end portion of the elastic sleeve.

Specifically, the shape of the inner circumferential surface of the one end portion of the long hole in the forward-backward direction is a semicircular shape having a fixed radius of curvature; the shape of the outer circumferential surface of the one end portion of the elastic sleeve is such that the center section has a radius of curvature that is less than the radius of curvature of the semicircular shape, and each of the sections on both sides of the center section is an arcuate shape having a radius of curvature greater than the radius of curvature of the semicircular shape; and the gap is provided in each of the sections on both sides between the inner circumferential surface of the one end portion of the long hole in the forward-backward direction, and the outer circumferential surface of the one end portion of the elastic sleeve.

Alternatively, the shape of the inner circumferential surface of the one end portion of the long hole in the forward-backward direction is a semicircular shape having a fixed radius of curvature; and the shape of the one end portion of the elastic sleeve has a flat plate section in the center and curved plate sections on both sides of the flat plate section. The gap is provided in the portion that corresponds to the flat plate section between the inner circumferential surface of the one end portion of the long hole in the forward-backward direction, and the outer circumferential surface of the one end portion of the elastic sleeve.

Alternatively or additionally, on both end portions in the forward-backward direction of the long hole in the forward-backward direction and the elastic sleeve, the gaps are provided between the inner circumferential surface of the long hole in the forward-backward direction and the outer circumferential surface of the elastic sleeve.

In a second embodiment of the present invention, the impact absorbing performance of the one end portion of the both end portions in the forward-backward direction of the elastic sleeve, which is the side where the adjustment rod is located with the entire length of the steering column completely contracted in order to move the forward-backward position of the steering wheel to the most forward adjustable position, is higher than the impact absorbing performance of the other end portion, which is the side where the adjustment rod is located with the steering column completely expanded.

Specifically, of the both end portions in the forward-backward direction of the elastic sleeve, the thickness dimension in the forward-backward direction of the one end portion is greater than the thickness dimension in the forward-backward direction of the other end portion.

Effect of Invention

With the present invention, a telescopic steering apparatus is provided such that when adjusting the forward-backward position of the steering wheel, and particularly when adjusting the steering wheel into the very front position, it is possible to reduce any uncomfortable feeling or feeling that something is wrong experienced by the driver, and it is possible to prevent a loss of support force of supporting the steering column by the vehicle body, even when an extremely large force is applied during adjustment.

In other words, with the present invention, as the forward-backward position of the steering wheel is forcibly displaced to the very front adjustable position and the adjustment rod forcibly collides with the inner circumferential surface of the end portions in the forward-backward direction of the elastic sleeve, the end portions of the elastic sleeve elastically deform. Due to this elastic deformation, impact energy that is transmitted between the adjustment rod and the support bracket is reduced. As a result, in addition to reducing any uncomfortable feeling or feeling that something is wrong experienced by the driver adjusting the forward-backward position of the steering wheel, it is possible to prevent the support bracket from breaking away in the forward direction.

BRIEF DESCRIPTION OF DRAWINGS

FIGS. 8A and 8B are views that correspond to FIGS. 6A and 6B of the second example of an embodiment of the present invention.

MODES FOR CARRYING OUT INVENTION

FIRST EXAMPLE

Figure 1:
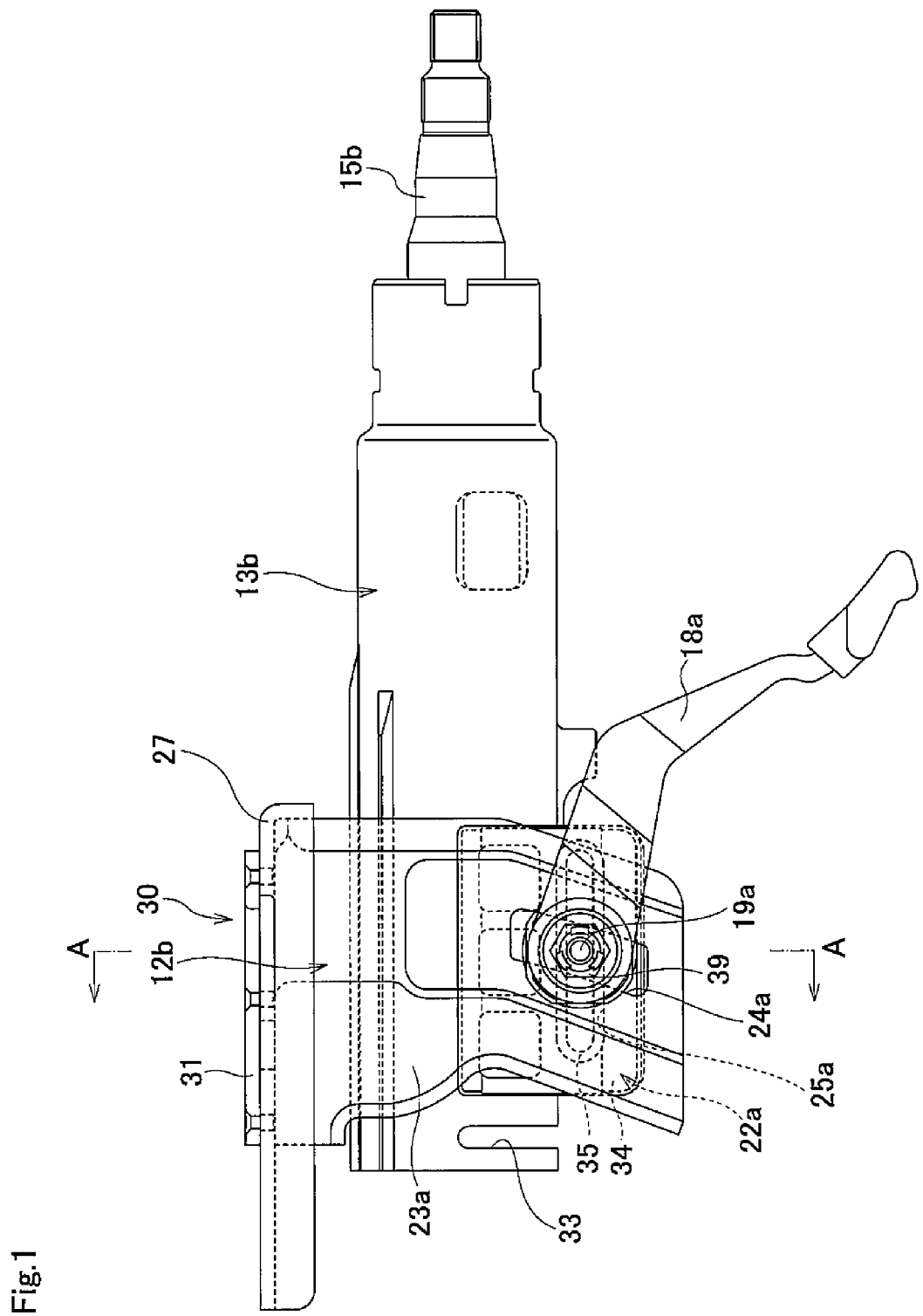
FIG. 1 is a side view illustrating main part of a first example of an embodiment of the present invention.
Figure 2:
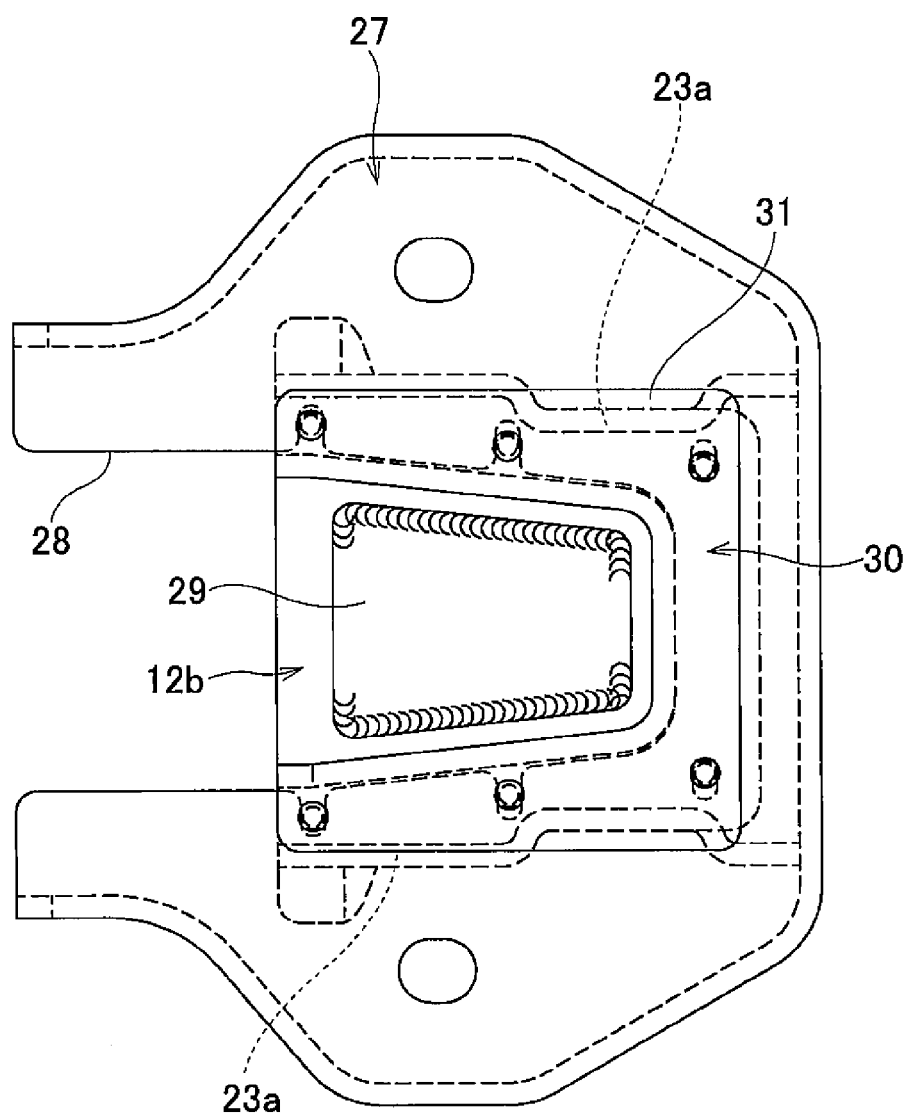
FIG. 2 is a top view with part omitted of the left end portion in FIG. 1.
Figure 3:
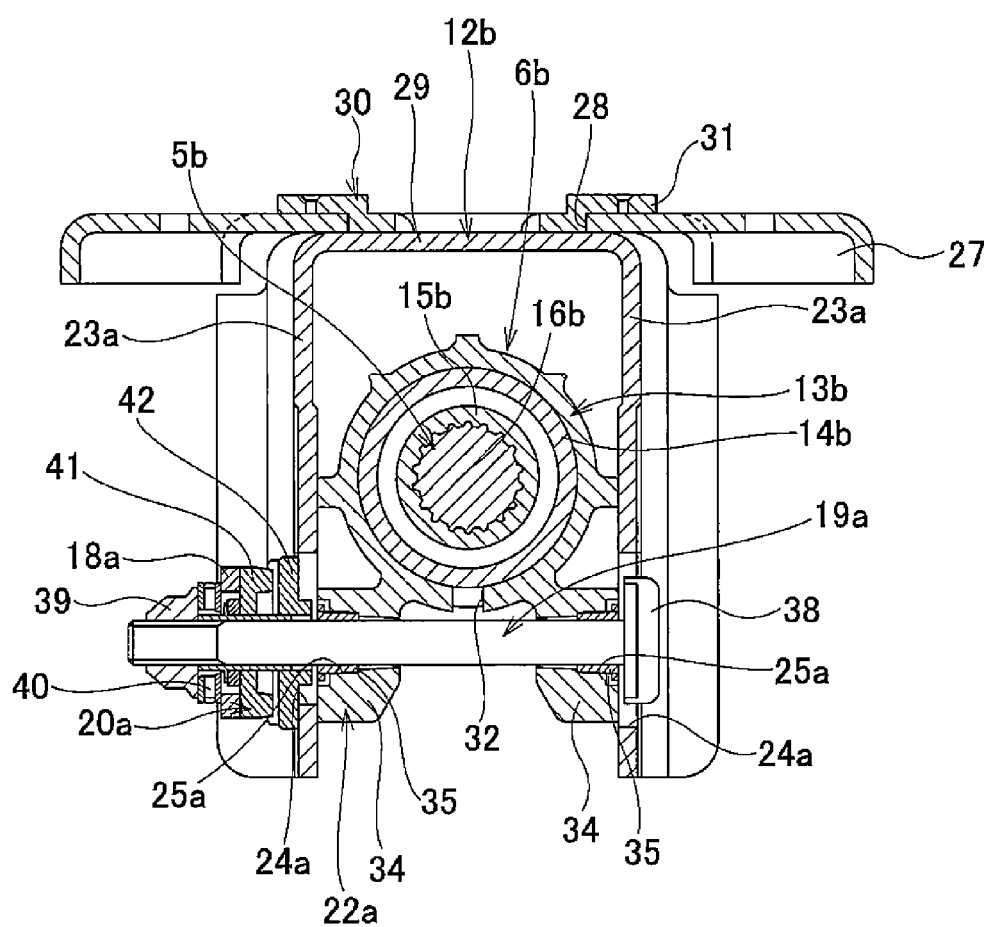
FIG. 3 is a cross-sectional view of section A-A in FIG. 1.
Figure 4:
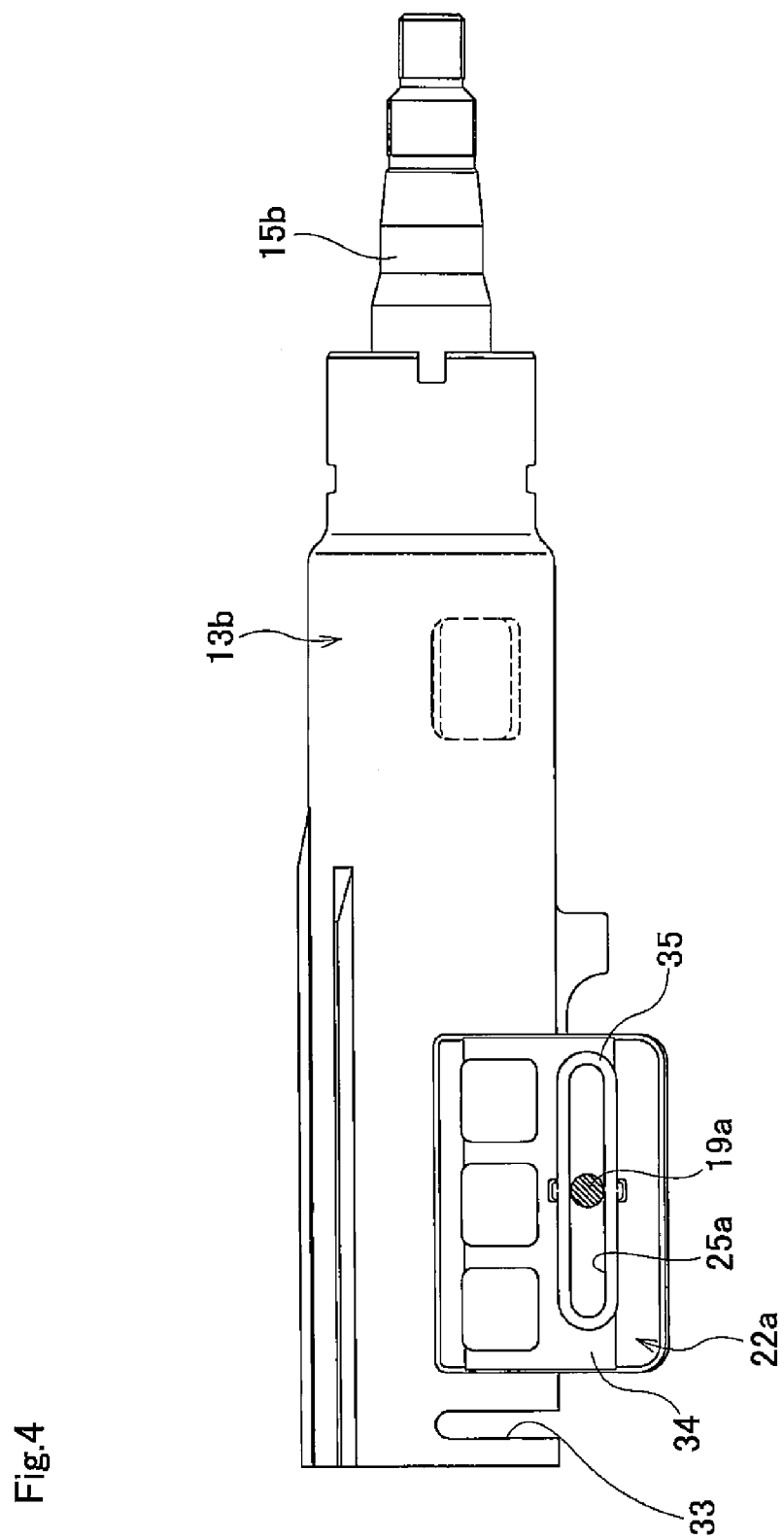
FIG. 4 is a side view as seen from the same direction as in FIG. 1 of only the outer column, outer shaft and adjustment rod taken out.
Figure 5:
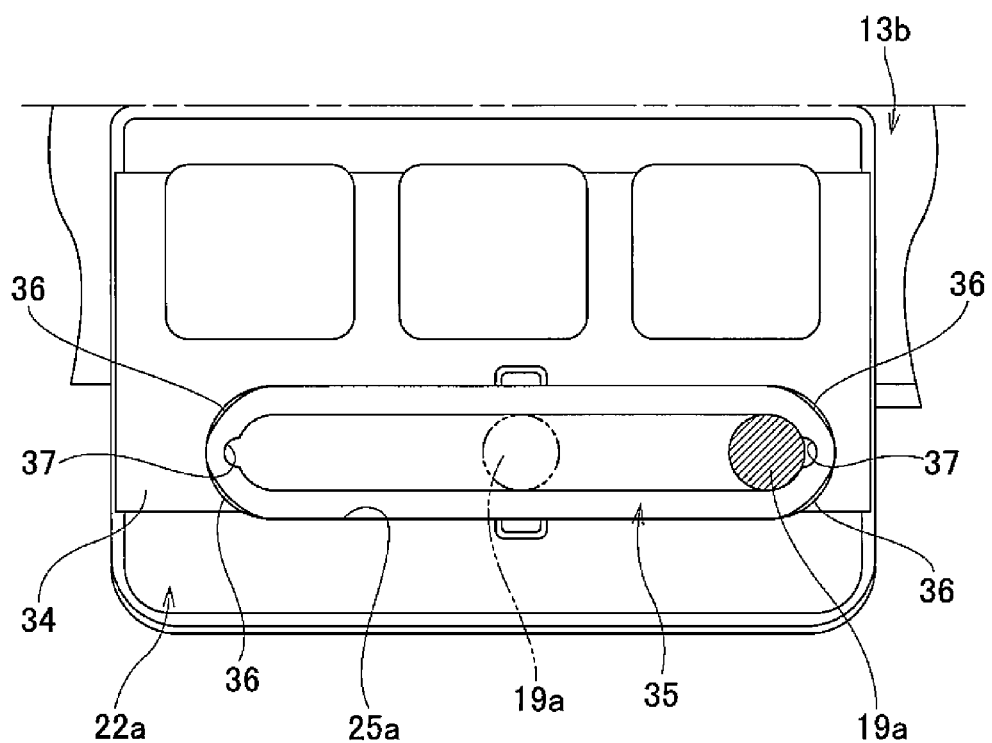
FIG. 5 is an enlarged view of the lower left portion in FIG. 4
Figure 6:
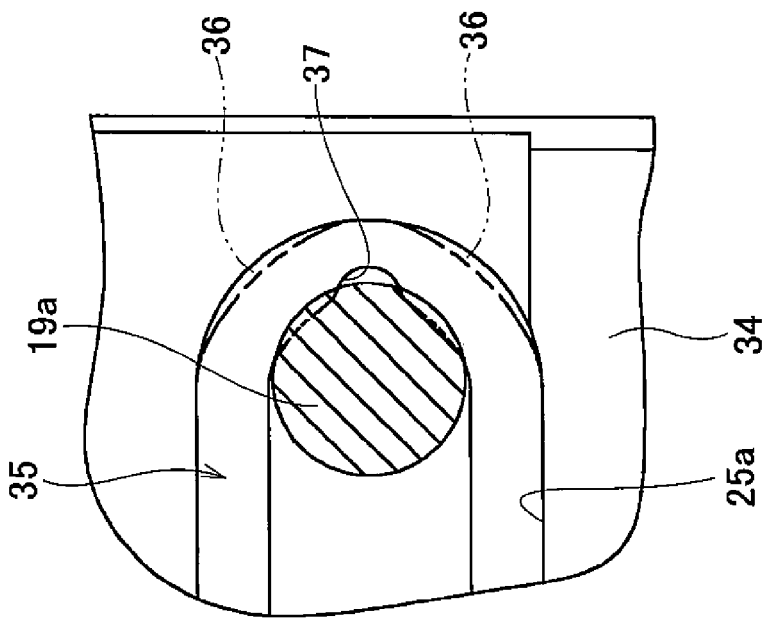
FIG. 6A is an enlarged view of the lower right portion in FIG. 5 and illustrates the state before elastic deformation of the elastic sleeve.
FIG. 6B is an enlarged view illustrating the elastically deformed state of the same.
Figure 6:
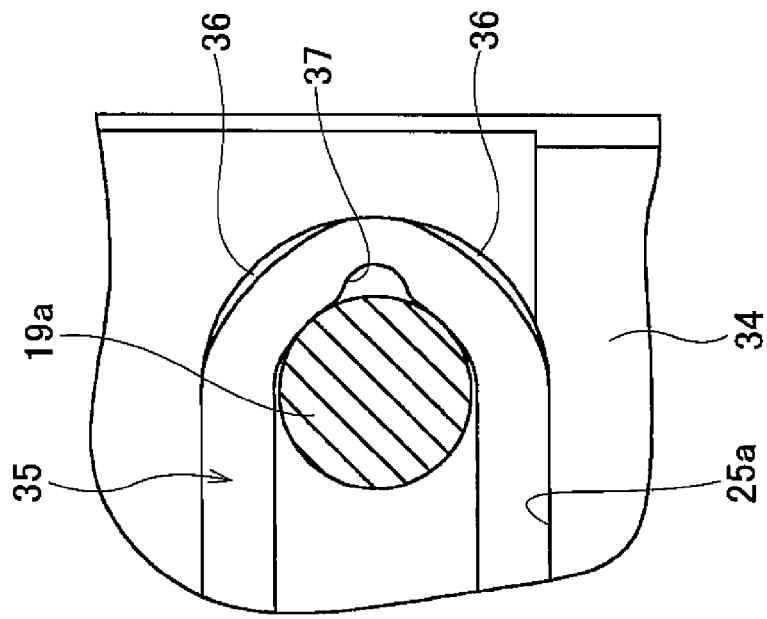

FIG. 1 to FIG. 6B illustrate a first example of an embodiment of the present invention. The telescopic steering apparatus of this example basically has: a steering column $6b$, a displacement bracket $22a$, an elastic sleeve $35$, a steering shaft $5b$, a support bracket $12b$, an adjustment rod $19a$, and an expansion and contraction mechanism $20a$, $38$. In the telescopic steering apparatus of this example, a vehicle body-side fastening bracket 27, which is supported by and fastened to the vehicle body, supports the support bracket 12b so as to be able to break away in the forward direction due to an impact load that is applied during a secondary collision. In order for this, the peripheral edge portion around a locking notch 28 that is formed in the center portion in the width direction of the vehicle body-side fastening bracket 27 and is open on the front side is held between the portions near both ends in the width direction of the top surface of a top plate portion 29 of the support bracket 12b and the bottom surface of a restraining plate portion 31 of a restraining bracket 30 that is welded and fastened to the top surface of the top plate portion 29. Connecting members that are made using a material such as synthetic resin that shears easily span small through holes or notches that are aligned with each other and that are formed in portions of the edges of the vehicle body-side fastening bracket 27 around the locking notch 28, the top plate portion 29 of the support bracket 12b and the restraining plate portion 31 of the restraining bracket 30. With this construction, the vehicle body-side fastening bracket 27 and the support bracket 12b are connected such that there is no looseness during normal use, and such that the support bracket 12b can break away in the forward direction during a secondary collision. For this, various conventionally know construction can be employed, and because this construction is known, an explanation will be omitted here.

Figure 18:
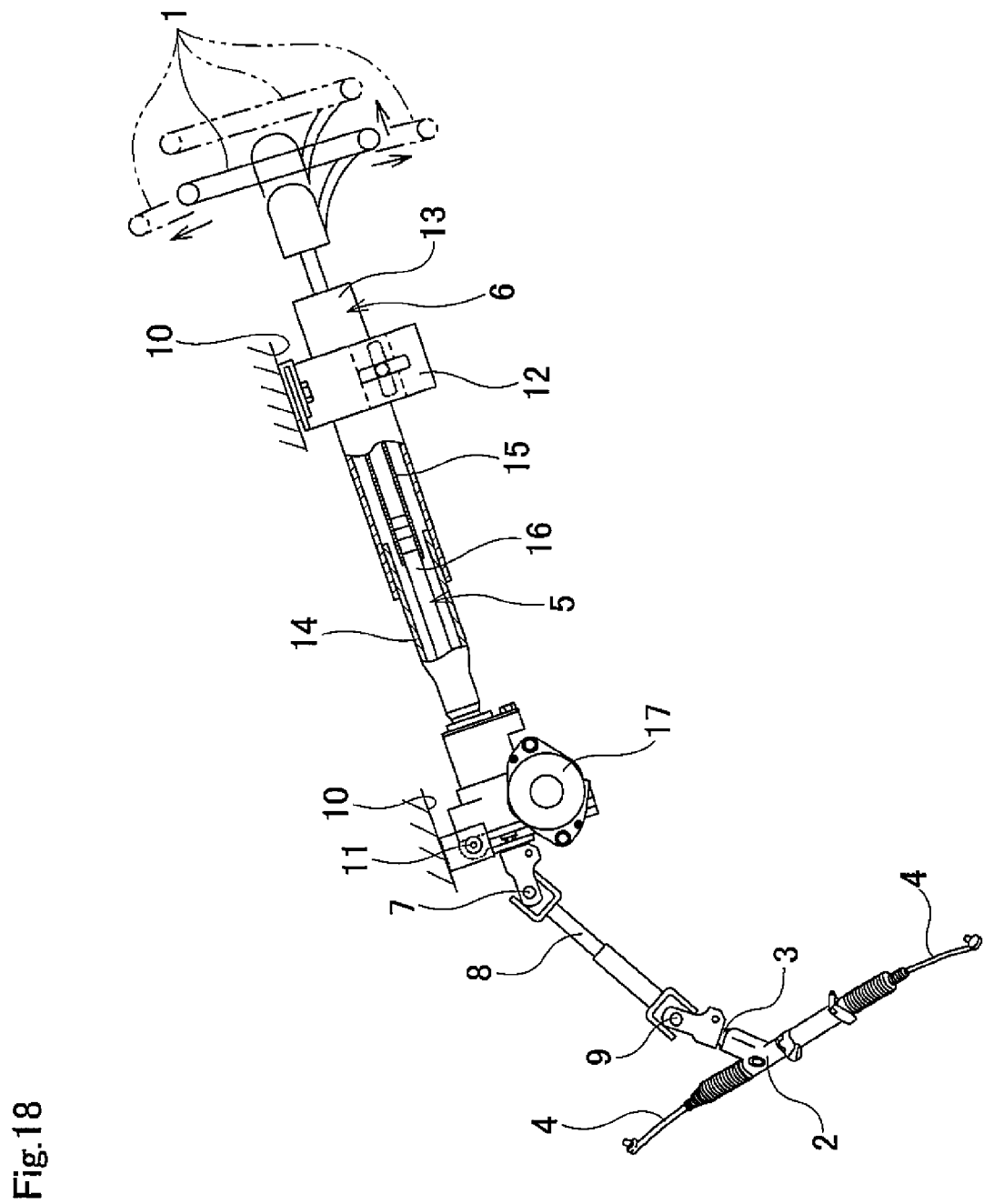
FIG. 18 is a partial cross-sectional side view of a conventionally known steering apparatus having a telescopic mechanism and tilt mechanism.
Figure 19:
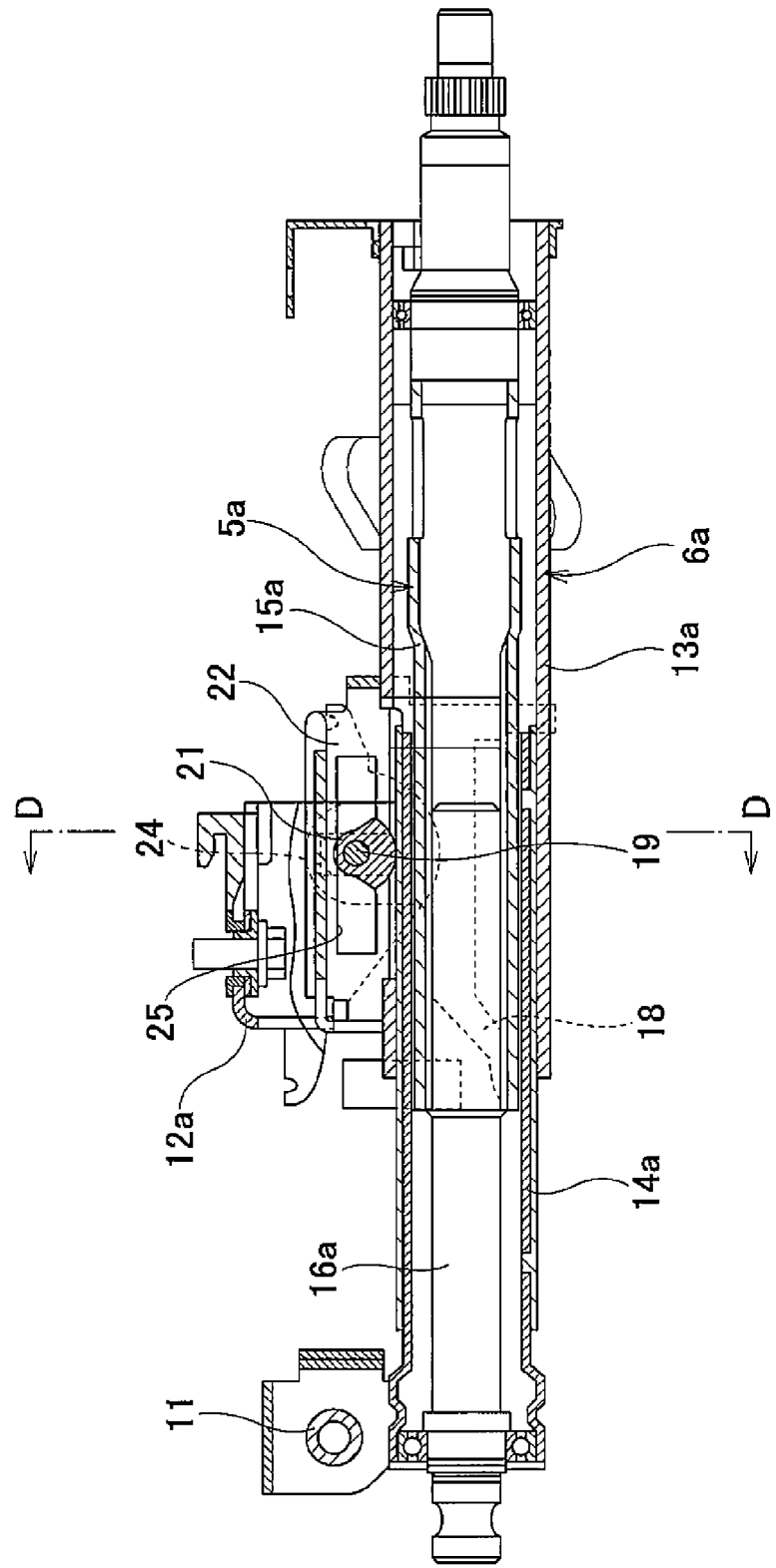
FIG. 19 is a vertical cross-sectional side view illustrating a second example of conventional construction.
Figure 20:
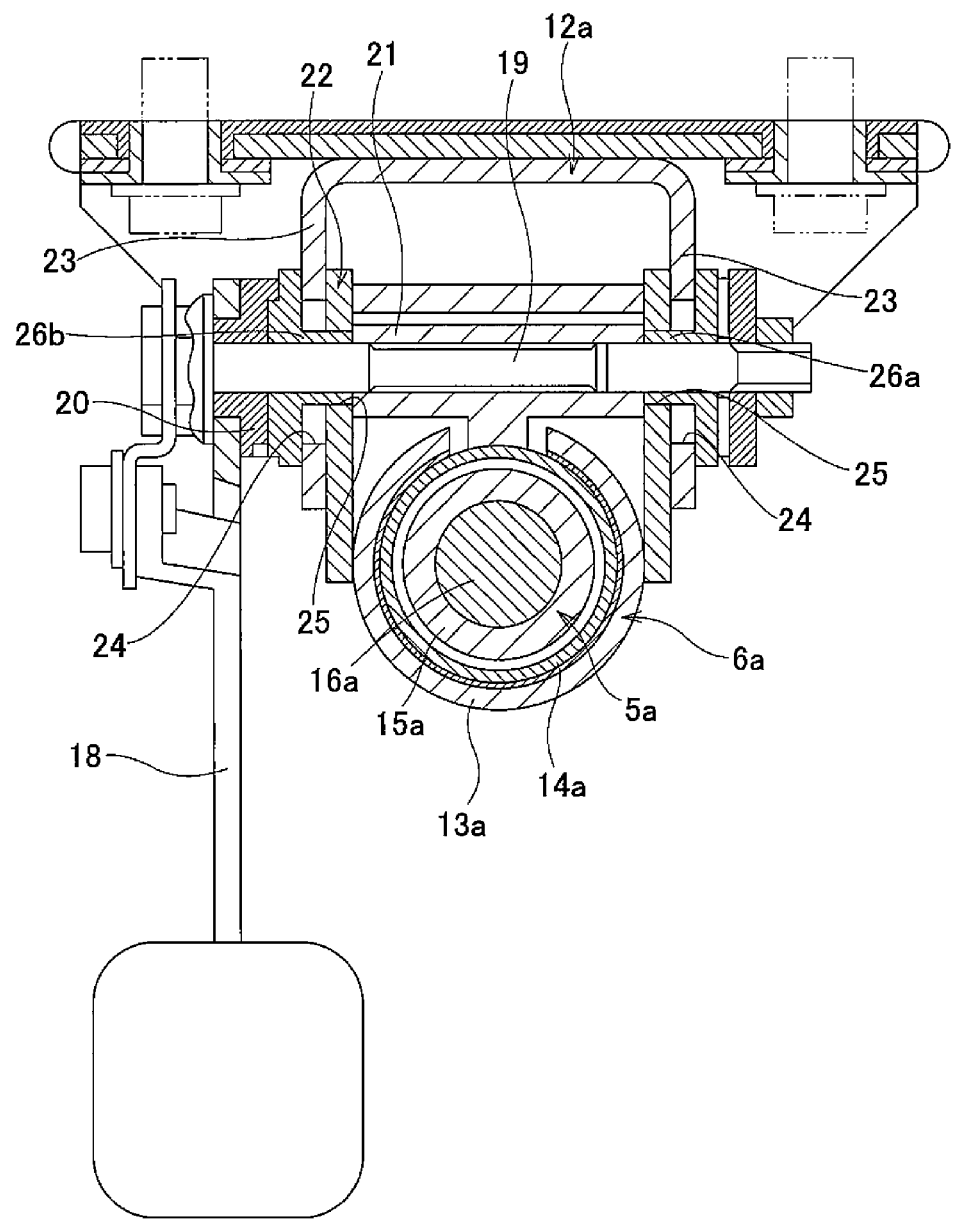
FIG. 20 is an enlarged cross-sectional view of section D-D in FIG. 19.

The support bracket 12b is obtained by bending and forming a metal plate such as steel plate that has sufficient strength and rigidity, and has a top plate portion 29 and a pair of support plate portions 23a that are bent downward at right angles from both the left and right end portions of the top plate portion 29. Long holes 24a in the up-down direction are formed in portions of these support plate portions 23a that are aligned with each other. These long holes 24a in the up-down direction have a partial arc shape centered around a pivot shaft 11 (see FIG. 18 and FIG. 19) that is the center of pivoting when adjusting the up-down position of the steering wheel 1.

The outer column 13b of the overall cylindrical steering column 6b is held between the pair of support plate portions 23a such that the forward-backward position and the up-down position can be adjusted. The steering column 6b has telescopic construction in which the front portion of the outer column 13b fits with the rear portion of the inner column 14b so that relative displacement in the axial direction is possible. The outer column 13b is made by casting (die casting) of a light alloy such as an aluminum alloy, to form a cylindrical shape. Moreover, a long slit 32 in the axial direction is formed in the bottom end portion of the front half of the outer column 13b, and the front end of the axial slit 32 is open to a slit 33 in the circumferential direction that is formed in the bottom half portion of the front end of the outer column 13b, and makes it possible for the inner diameter of the front half portion that corresponds to one end portion in the axial direction of the outer column 13b to elastically expand and contract. The front end portion of the inner column 14b is connected and fastened to the housing of the power-steering apparatus for example, and by supporting this housing by the pivot shaft 11 so as to be able to pivotally displace with respect to the vehicle body, it is possible to adjust the up-down position of the rear end portion of the steering column 6b.

However, the present invention can also be embodied in a steering apparatus that does not have a tilt mechanism and only has a telescopic mechanism. In that case as well, in order to apply the present invention, long holes in the forward-backward direction are formed in the displacement bracket side. In a telescopic steering apparatus in which the present invention is not applied, a simple through hole (circular hole) is formed in the displacement bracket, and long holes in the forward-backward direction can be formed in the pair of left and right support plate portions of the support bracket. In this case, the adjustment handle also moves in the forward-backward direction during adjustment of the forward-backward position of the steering wheel. The dimension of the thickness of the support plate portions is small, and the width dimension of the inner surfaces of the long holes in the forward-backward direction that are formed in the support plate portions small, so it is difficult to mount an elastic sleeve in the long hole in the forward-backward direction.

Moreover, a pair of held plate portions 34 of the displacement bracket 22a are formed on both the left and right sides of the slit 32 in the axial direction. The held plate portions 34 are basically a flat plate shape and are integrally cast with the outer column 13b, however, concave portions are formed at a plurality of locations of each for reducing the weight and for preventing sink marks from occurring (depression due to mold shrinkage) after casting. Long holes 25a in the forward-backward direction are formed parallel to the center axis of the outer column 13b at positions in the held plate portions 34 that are aligned with each other. Moreover, both end portions in the forward-backward direction of the long holes 25a in the forward-backward direction as seen from the width direction (as illustrated in FIG. 1, FIG. 4 to FIG. 6) are semicircular with a fixed radius of curvature. In this example, the inner circumferential surfaces of the long holes 25a in the forward-backward direction are such that there are stepped portions at two locations in the middle sections, and are stepped shaped such that the surface area of the opening becomes narrower going from the outside surface sides of the long holes 25a in the forward-backward direction toward the inside surface sides. The held plate portions 34 are made together with the main portion of the outer column 13b by casting a light metal alloy, so the width dimensions of the long holes 25a in the forward-backward direction, and the shape of the inner circumferential surface can be arbitrarily adjusted. Therefore, the contact surface area between the inner circumferential surface of the long holes 25a in the forward-backward direction and the outer circumferential surface of the pair of elastic sleeves 35 described in the following can also be arbitrarily adjusted.

In this example, the displacement bracket 22a is located on the underneath side of the steering column 6b, however, it is also possible to provide the displacement bracket on the upper side of the steering column. Moreover, the steering column can be constructed such that the outer column is located on the front side and the inner column is located on the rear side.

Elastic sleeves 35 made of an elastomer such as rubber are fitted and supported inside the pair of long holes 25a in the forward-backward direction. Each of the elastic sleeves 35 has a main portion that is fitted in the middle portion in the penetrating direction (left-right direction in FIG. 3) of the long hole 25a in the forward-backward direction, and a flange portion that is formed in the end portion on the outside surface side of the held plate portion 34 in a state so as to protrude around the entire circumference. Moreover, the shape of the outer circumferential surface of both end portion in the forward-backward direction of the elastic sleeve 35 is an arcuate shape with the top section being rounded. In other words, as illustrated in FIG. 5 to FIGS. 6A and 6B, with the elastic sleeve 35 in the free state, the radius of curvature of the center portion of the outer circumferential surface of both end portions in the forward-backward direction of the elastic sleeves 35 is a little less than the radius of curvature of the semicircular shape of both end portions in the forward-backward direction of the long hole 25a in the forward-backward direction, and the radius of curvature of the portions on both sides of the center portion is larger than the radius of curvature of this semicircular shape. There are arc shaped (crescent shaped) gaps 36 as illustrated in FIG. 5 to FIGS. 6A and 6B located between the inner circumferential surface of both end portions in the forward-backward direction of the long hole 25a in the forward-backward direction and the outer circumferential surface of both end portions in the forward-backward direction of the elastic sleeve 35. Furthermore, in this example, concave portions 37 are formed in the center portions of the inner circumferential surface of both end portions in the forward-backward direction of the elastic sleeve 35, and in this center portion, the thickness of the elastic sleeve 35 is less than in the portions on both sides of this center portion.

Moreover, the steering shaft 5b is supported on the inside of the steering column 6b so as to be able to rotate freely. The steering shaft 5b is constructed such that the front half portion of the outer shaft 15b on the rear side fits with the rear half portion of the inner shaft 16b on the front side by a spline fit so as to be able to transmit torque and to extend and contract. The outer shaft 15b is supported on the inside of the outer column 13b in a state such that displacement in the axial direction with respect to the outer column 13b is prevented, and is able to rotate. The steering wheel 1 (see FIG. 18) can be fastened to the portion on the rear end portion of the outer shaft 5b that protrudes from the opening on the rear end of the outer column 13b.

Furthermore, the adjustment rod 19a is inserted through the inside of the elastic sleeves 35 that are mounted inside the long holes 24a in the up-down direction, and the long holes 25a in the forward-backward direction. With the expansion and contraction mechanism in which the adjustment rod 19a is assembled, it is possible to expand or contract the space between the support plate portions 23a, adjust the up-down position and forward-backward position of the outer column 13b, and maintain the outer column 13b in the adjusted position. In order to construct the expansion and contraction mechanism, a head portion 38 that is provided on the base end portion of the adjustment rod 19a (right end portion in FIG. 3) engages with the long hole 25a in the up-down direction that is formed in one of the support plate portions 23a (right one in FIG. 3) so as to be able to displace only along this long hole 25a in the up-down direction (the adjustment rod is prevented from rotating). On the other hand, a thrust bearing 40 and a cam apparatus 20a are provided between a nut 39 that is screwed onto and fastened to the tip end portion of the adjustment rod 19a and the outside surface of the other support plate portion 23a (left one in FIG. 3) in that order from the side of the nut 39. The cam apparatus 20a is constructed such that the dimension in the axial direction expands or contracts based on relative displacement between a driving cam 41 and a driven cam 42, the driven cam 42 engaging with the long hole 25a in the up-down direction that is formed in the other support plate portion 23a so as only to be able to displace along this long hole 25a in the up-down direction. On the other hand, the driving cam 41 is able to be rotated by the adjustment handle 18a around the adjustment rod 19a.

When adjusting the up-down position or the forward-backward position of the steering wheel 1, the adjustment handle 18a is rotated downward, which reduces the dimension in the axial direction of the cam apparatus 20a. As a result, the space between the head portion 38 and the driven cam 42 is expanded, and the force by which the support plate portions 23a hold the pair of left and right held plate portions 34 of the displacement bracket 22a is reduced or lost. At the same time, the inner diameter of the front half portion of the outer column 13b is elastically expanded, and the pressure in the area of fit between inner circumferential surface of the front half portion of the outer column 13b and the outer circumferential surface of the rear half portion of the inner column 14b is decreased or lost. In this state, the up-down position of the steering wheel 1 can be adjusted within the range that the adjustment rod 19a is able to displace inside the long holes 24a in the up-down direction. Moreover, it is possible to adjust the forward-backward position of the steering wheel 1 within the range that the adjustment rod 19a is able to displace inside the elastic sleeves 35a. After the steering wheel 1 has been moved to a desired position, the adjustment handle 18a is rotated upward to expand the dimension in the axial direction of the cam apparatus 20a, which reduces the space between the head portion and the driven cam 42, and the support plate portions 23a firmly hold the pair of left and right held plate portions 34 of the displacement bracket 22a. At the same time, the inner diameter of the front half portion of the outer column 13b is reduced, and the strength of the fit between the front half portion of the outer column 13b and the rear half portion of the inner column 14b is increased. As a result, it is possible to maintain the steering wheel 1 in the adjusted position.

In the case of the telescopic steering apparatus of this example, when adjusting the forward-backward position of the steering wheel 1, it is possible to prevent a large impact from being applied to the outer column 13b even when the adjustment rod 19a is forcibly displaced inside the elastic sleeves 35 to both end portions in the forward-backward direction. In other words, when the adjustment rod 19a is displaced with great force to the end portions of the elastic sleeves 35, the elastic sleeves 35 elastically displace from the state illustrated in FIG. 6A to the state illustrated in FIG. 6B. That is, the end portions of the elastic sleeves 35 elastically deformed in the direction away from the adjustment rod due to the existence of the gaps 36. At the same time, the thickness of the portions of the elastic sleeves 35 that come in contact with the adjustment rod 19a is also elastically compressed. Through the combination of both of these buffering actions, the portion of the impact energy that is applied to the end portions of the elastic sleeves 35 from the adjustment rod 19a is absorbed.

As a result, it is possible to reduce any uncomfortable feelings or feelings that something is wrong that are experienced by the driver adjusting the forward-backward position of the steering wheel 1. Furthermore, it is possible to reduce the impact energy that is applied to the support bracket 12b from the outer column 13b by way of the adjustment rod 19a, so it is possible to prevent the support bracket 12b from breaking away in the forward direction even when the driver moves the steering wheel 1 with an extremely large force to the very front. In other words, when the driver moves the outer column 13b in the forward direction with great force by way of the steering wheel 1 and the outer shaft 15b with the adjustment handle 18a rotated downward, the adjustment rod 19a displaces with great force toward the rear end portion of the long holes 25a in the forward-backward direction. The energy of the outer column 13b that is moving in the forward direction is impulsively transmitted to the support bracket 12b by way of the adjustment rod 19a.

When the impact energy that is transmitted to the support bracket 12b is large, the synthetic resin connecting members that connect the support bracket 12b and the vehicle body-side fastening bracket 27 shear off and the support bracket 12b breaks away in the forward direction. On the other hand, with the construction of this example, the portion of the impact energy that is transmitted to the adjustment rod 19a from the outer column 13b can be absorbed due to the elastic deformation of the elastic sleeves 35, so the breaking away of the support bracket 12b in the forward direction due to impact when a driver having a strong build handles the steering column roughly. Impact energy that is transmitted to the adjustment rod 19 during a secondary collision is much larger than the impact energy that is applied during this kind of rough operation, so the support bracket 12b breaks away in the forward direction, which reduces the impact that is applied to the driver's body that collides with the steering wheel 1. In this case as well, the impact absorbing performance by elastic deformation of the elastic sleeves 35 aids in protecting the driver. For example, in the example illustrated in the figures, the adjustment rod 19a is directly below the top plate portion 29 of the support bracket 12b. This kind of construction is advantageous from the aspect of maintaining the support rigidity of the outer column 13b by the support bracket 12b, but on the other hand, in the portions where the adjustment rod 19a is located, the rigidity in the width direction of the support plate portions 23a becomes high. Therefore, it becomes easy for the resistance against reducing the space between the head portion 38 and the driven cam 42 by using the adjustment handle 18a to become large, so this construction is a little disadvantageous from the aspect of increasing the force by which the support plate portions 23a support the outer column 13b. Therefore, in a secondary collision, before the support bracket 12b breaks away in the forward direction, it is easy for the adjustment rod 19a to move toward the rear end portions of the elastic sleeves 35. In this case as well, impact energy is absorbed due to the elastic deformation of the rear end portions of the elastic sleeves 35, which is advantageous from the aspect of protecting the driver.

Typically, when adjusting the forward-backward position of the steering wheel 1, pressing force is larger than pulling force, so the case moving the steering wheel 1 toward the front with great force occurs more often. Moreover, the possibility that the support bracket 12b will break away in the forward direction occurs when the steering wheel 1 is forcibly moved toward the front. Therefore, in the state where the steering wheel 1 has been moved to the furthest adjustable position in the rear, an impact absorbing function is not always necessary. However, providing this impact absorbing function in both the forward and backward direction is advantageous from the aspect of achieving construction in which in addition to eliminating the need for regulating the assembly direction of the elastic sleeves 35 and the possibility of assembly error, the driver does not have an uncomfortable feeling when performing adjustment to the rear end position.

SECOND EXAMPLE

Figure 7:
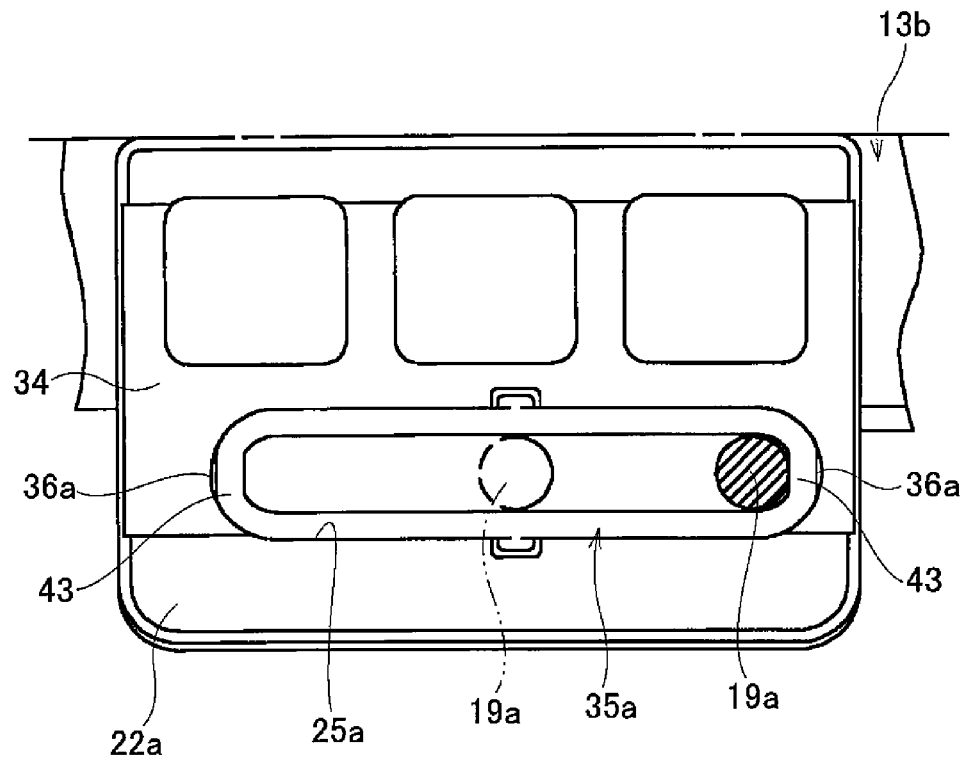
FIG. 7 is a view that corresponds to FIG. 5, and illustrates a second example of an embodiment of the present invention.

FIG. 7 and FIG. 8B illustrate a second example of an embodiment of the present invention. In this example, the shape of both end portions in the forward-backward direction of the elastic sleeves 35a for creating gaps 36a for absorbing impact is different than in the first example. Specifically, the shape of the inner circumferential surfaces of the end portions of the long holes 25a in the forward-backward direction, as in the case of the first example of the embodiment, is semicircular with a fixed radius of curvature, and the shape of both end portions in the forward-backward direction of the elastic sleeves 35a has a flat plate sections 43 in the center portion and curved plate sections on both side portions that are on both sides of the flat plate sections 43. Gaps 36a are provided in the portions that correspond to the flat plate sections 43 between the inner circumferential surface of the end portions of the long holes 25a in the forward-backward direction and the outer circumferential surfaces of both end portions of the elastic sleeves 35a. The construction and functions of the other parts of this example are the same as in the first example of an embodiment.

THIRD EXAMPLE

FIG. 9 to FIG. 12 illustrate a third example of an embodiment of the present invention. In this example, by making the thickness dimensions of the front end portions and the rear end portions of the elastic sleeves 35b different from each other, the impact absorbing performance of the front-side impact absorbing portion 44 and the rear-side impact absorbing portion 45, which are both semi-cylindrical, differs from each other. Specifically, the impact absorbing performance of the rear-side impact absorbing portion 45 that the adjustment rod 19a faces when the steering wheel 1 (see FIG. 19) is moved to the very front adjustable position, is higher than the impact absorbing performance of the front-side impact absorbing portion 44 that the adjustment rod 19a faces when the steering wheel 1 moved to the very rear adjustable position. In order for this, of the impact absorbing portions 44, 45 on both end portions in the forward-backward direction of the elastic sleeves 35b, the thickness dimension T in the forward-backward direction of the rear-side impact absorbing portion 45 is greater than the thickness dimension t in the forward-backward direction of the front-side impact absorbing portion (T>t).

In this example, the thickness dimension T of the rear-side impact absorbing portion 45 is large, and the support bracket 12b is prevented from breaking away toward the front even when the steering wheel 1 is forcibly caused to displace to the very front adjustable position. On the other hand, in regards to the front-side impact absorbing portion 44 that functions when there is movement in the direction where there is no possibility that break away will occur, the thickness dimension t is kept small within a range where it is possible to suppress any uncomfortable feeling that the driver may have when adjusting the forward-backward position of the steering wheel 1. Therefore, in order to achieve construction that is capable of preventing the driver from having an uncomfortable feeling or a feeling that something is wrong when adjusting the position of the steering wheel 1 in either the forward or backward direction, the dimension in the forward-backward direction of the held plate portions 34 of the displacement bracket 22a where the long holes 25a in the forward-backward direction are provided is prevented from becoming unnecessarily large regardless of construction in which a front-side impact absorbing portion 44 and rear-side impact absorbing portion 45 are provided in both end portions in the forward-backward direction of the long holes 25a in the forward-backward direction.

Figure 12:
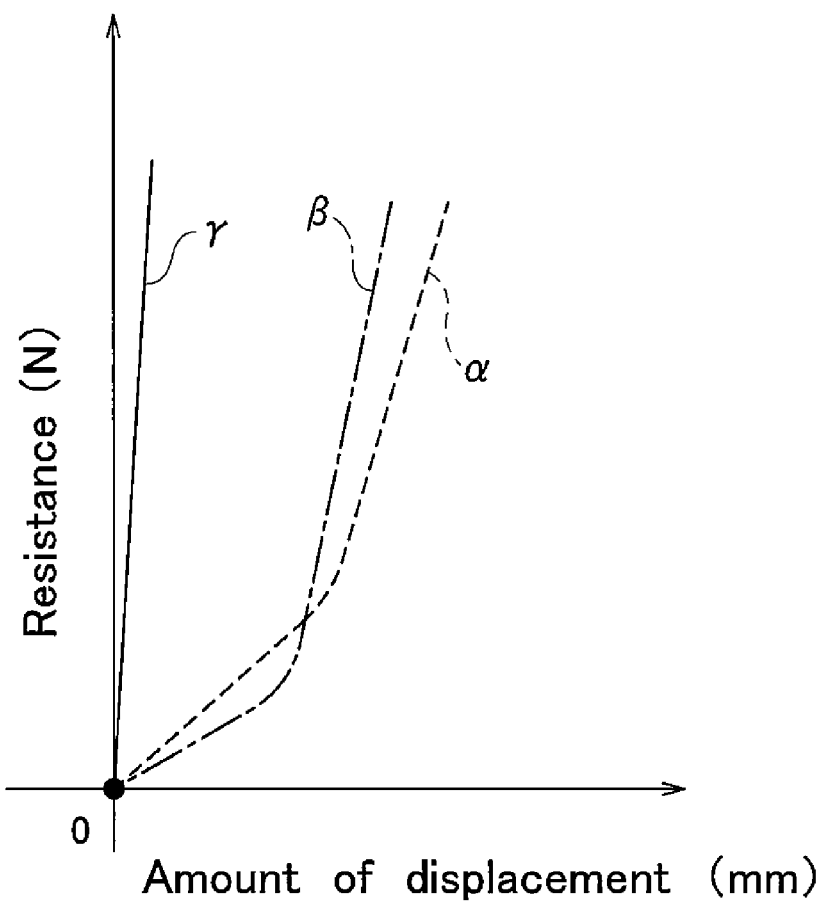
FIG. 12 is a graph illustrating the effect of the differences in specifications of the shock absorbing mechanism on the relationship between the amount of displacement in the forward-backward direction of the steering wheel and the resistance to the displacement.

FIG. 12 illustrates the characteristics of the front-side impact absorbing portion 44 and the rear-side impact absorbing portion 45 for absorbing impact that is applied from the adjustment rod 19a, where the horizontal axis illustrates the amount of displacement of the adjustment rod 19a, and the vertical axis illustrates the value of resistance against displacement of the adjustment rod 19a (size of impact energy that can be absorbed). The dashed line α in FIG. 12 illustrates the energy absorbing characteristics of the rear-side impact absorbing portion 45, and the chain line β illustrates the energy absorbing characteristics of the front-side impact absorbing portion 44. Of the dashed line α and the chain line β, the portions that start at the origin (zero) and incline with a comparatively gentle slope is the range where the adjustment rod 19a is allowed to displace by the front-side impact absorbing portion 44 and the rear-side impact absorbing portion 45 elastically deforming while eliminating the gaps 36. After that, the portions where the incline has a comparatively steep slope is the range where the adjustment rod 19a is allowed to displace by the elastic material of the front-side impact absorbing portion 44 and the rear-side impact absorbing portion 45 elastically deforming in the direction of compression after the gaps 36 have been eliminated. Furthermore, the solid line γ in FIG. 12 illustrates the energy absorbing characteristics in the case where no impact absorbing mechanism made of an elastic material is provided in the end portions of the long holes 25a in the forward-backward direction, and there is direct impact between the inner circumferential surface of the long holes 25a in the forward-backward direction that are formed in the held plate portions 34 made of a light metal alloy and the outer circumferential surface of the adjustment rod 19a made of tool steel. From each of the lines α, β and γ in FIG. 12, it can be seen that with the construction of this example, when the steering wheel 1 is caused to displace to both end portions in the forward-backward direction, it is possible to obtain suitable impact absorbing characteristics.

Figure 9:
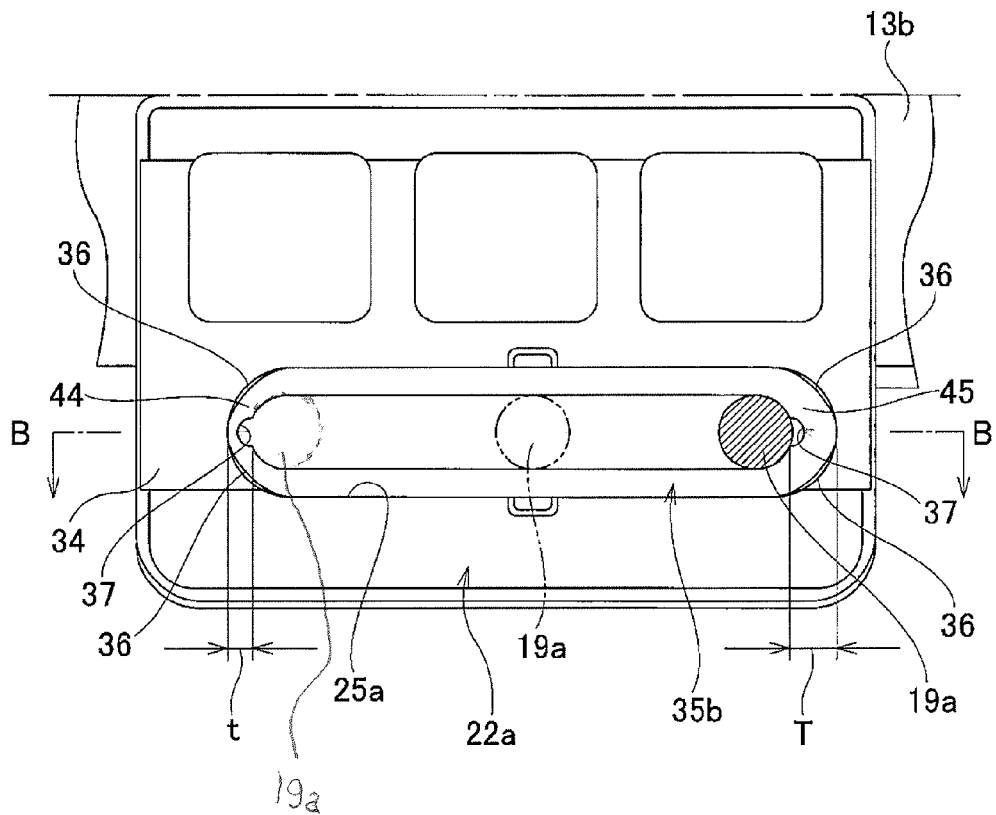
FIG. 9 is a view that corresponds to FIG. 5, and illustrates a third example of an embodiment of the present invention.
Figure 10:
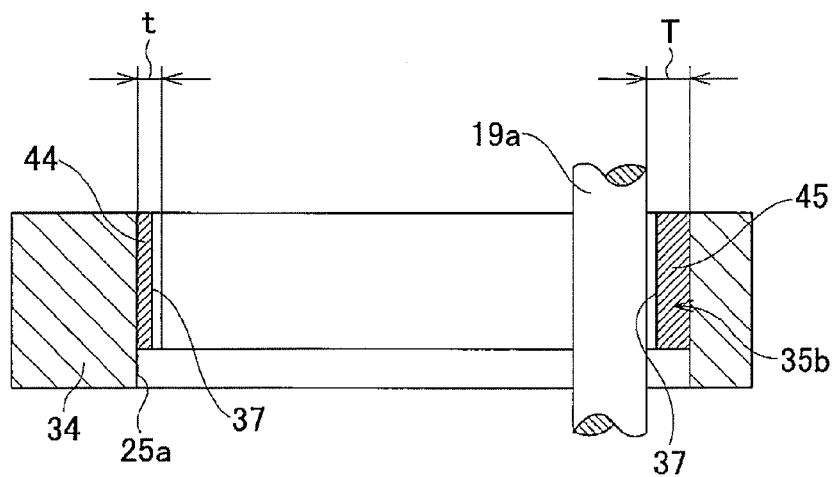
FIG. 10 is a cross-sectional view of section B-B in FIG. 9.
Figure 11:
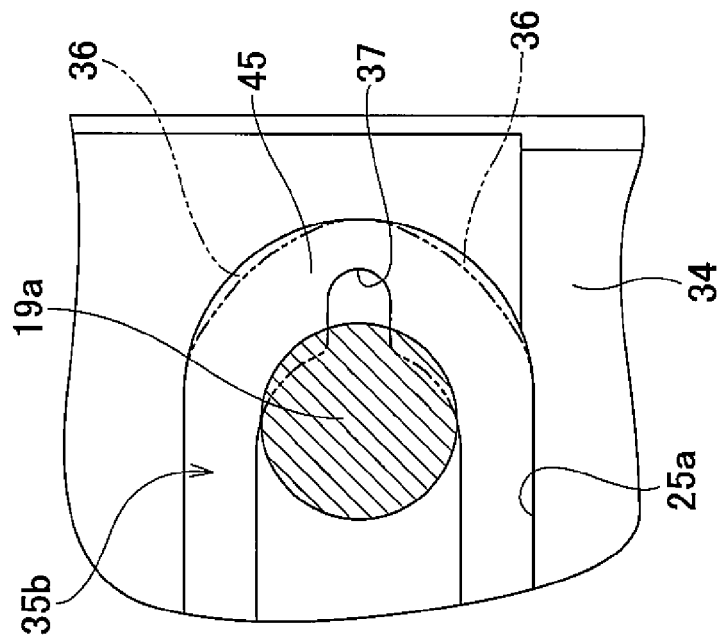
FIGS. 11A and 11B are views that correspond to FIGS. 6A and 6B, and illustrate the third example of an embodiment of the present invention.
Figure 11:
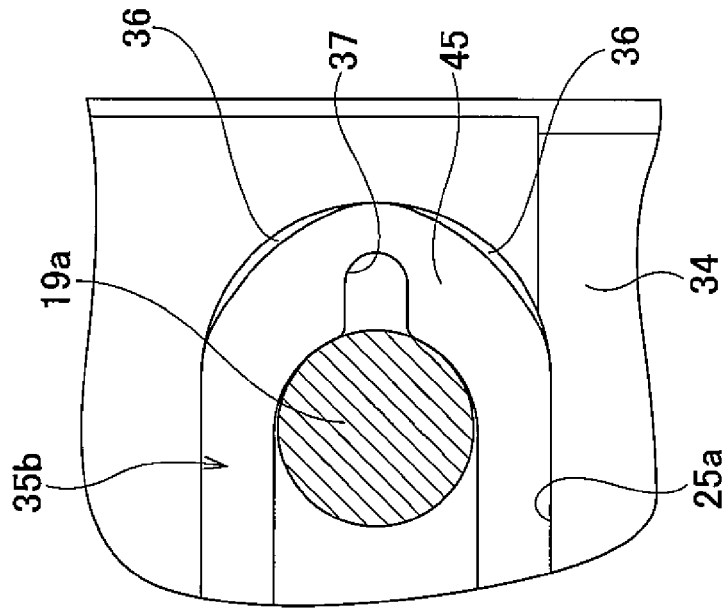

The slopes of the lines α, β and γ in FIG. 12 are schematically illustrated and do not represent the actual ratio of the impact absorbing characteristics of each construction. The actual ratio can be arbitrarily adjusted according to the material (elastic coefficient) of the elastic sleeves 35b and the thickness dimensions t, T of the impact absorbing portions 44, 45 on the front side and rear side. Incidentally, with a dimensional relationship as illustrated in FIG. 9, the chain line β is overall further toward the left than in FIG. 12, and conversely, the dashed line α is overall further toward the right than in FIG. 12.

As a variation of the construction in this example, it is possible to omit the concave portion 37 and gaps 36 for the front-side impact absorbing portion 44. In the case that these are omitted, the portion of the right half portion of the chain line β where the incline has a comparatively steep slope, starts as is from the origin. The construction and functions of the other parts of this example are the same as in the first example of an embodiment.

FOURTH EXAMPLE

Figure 13:
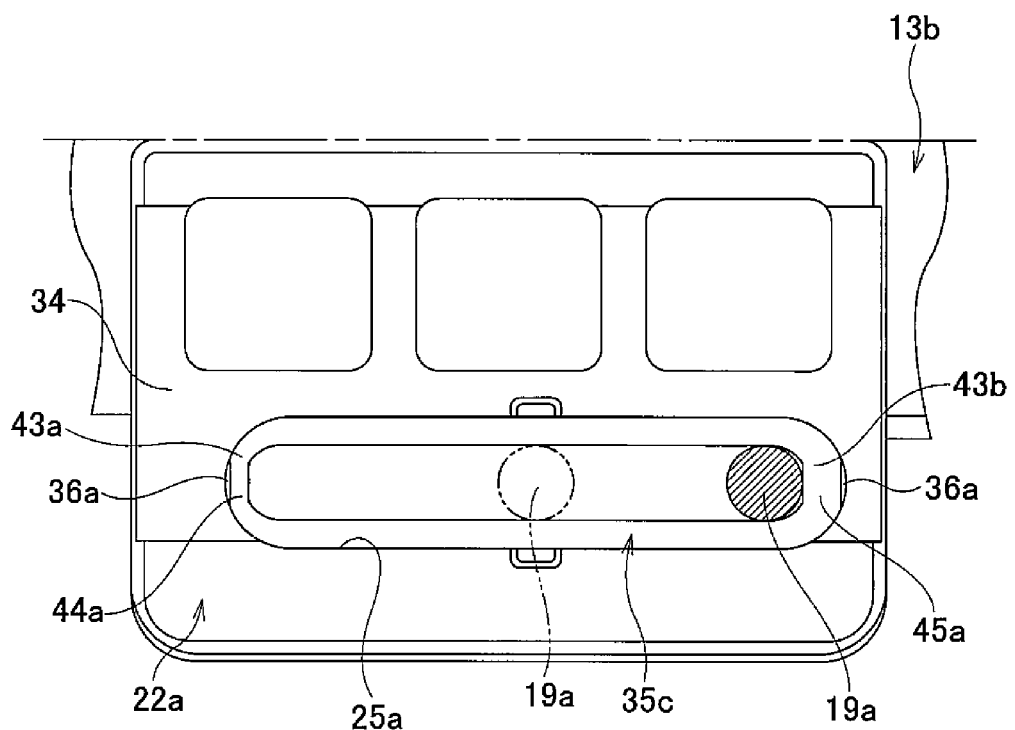
FIG. 13 is a view that corresponds to FIG. 5, and illustrates a fourth example of an embodiment of the present invention.
Figure 14:
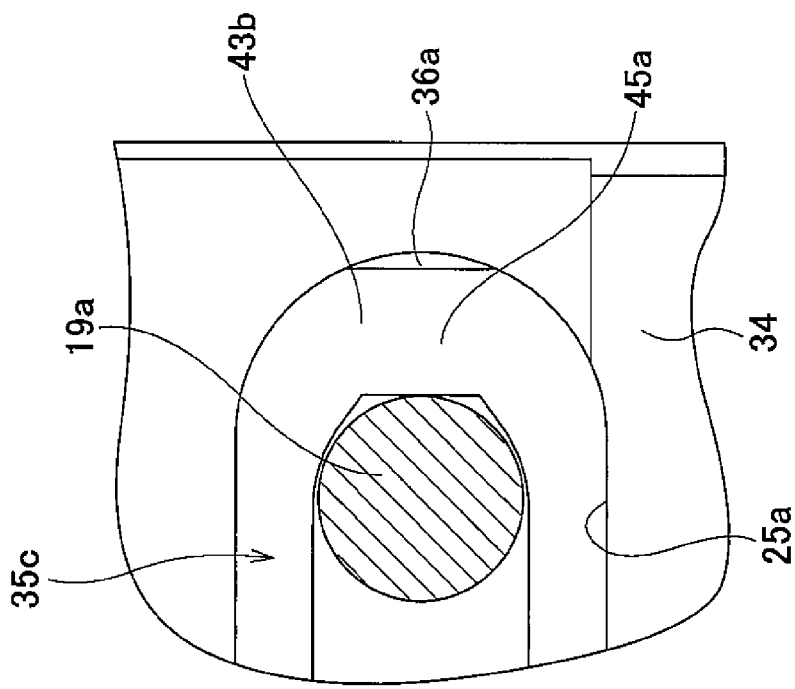
FIGS. 14A and 14B are views similar to FIGS. 6A and 6B of the fourth example of an embodiment of the present invention.
Figure 14:
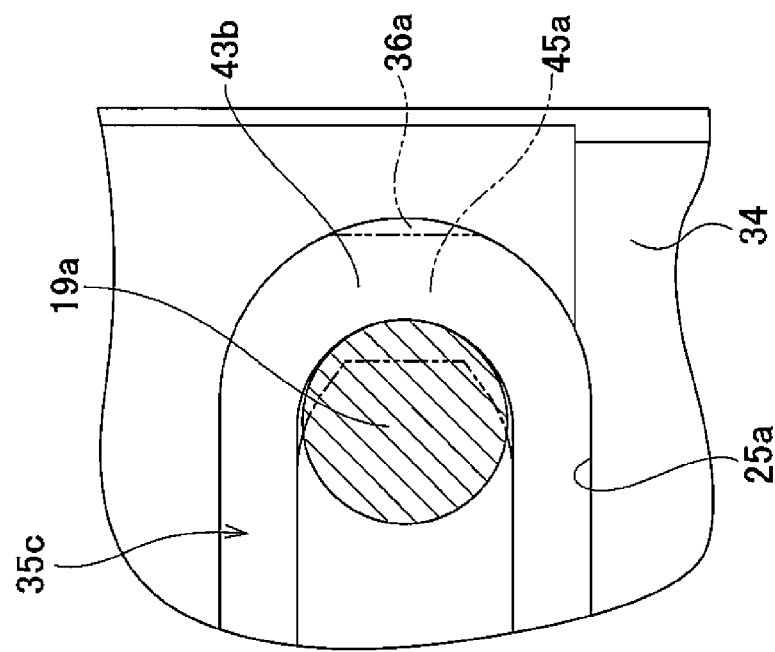

FIG. 13 to FIG. 14B illustrate a fourth example of an embodiment of the present invention. In this example, the shape of the front-side impact absorbing portions 44a and the rear-side impact absorbing portions 45a that are provided on both end portions in the forward-backward direction of the elastic sleeves 35c in order to provide a gap 36a for absorbing impact differs from that in the third example of the embodiment. Specifically, the shape of the inner circumferential surface of the end portions of the long holes 25a in the forward-backward direction is the same as in the second example of an embodiment, and is a semicircular shape having a fixed radius of curvature, and the shape of both end portions in the forward-backward direction of the elastic sleeves 35c have a flat plate section 43a, 43b in the center portion, and curved plate sections on both side portions that are on both sides of the flat plate sections 43a, 43b. In the portions that correspond to the flat plate sections 43a, 43b, there is a gap 36a between the inner circumferential surfaces of both end portions of the long holes 25a in the forward-backward direction and the outer circumferential surfaces of both end portions of the elastic sleeves 35c. The construction and functions of the other parts of this example are the same as in the third example of the embodiment.

FIFTH EXAMPLE

Figure 15:
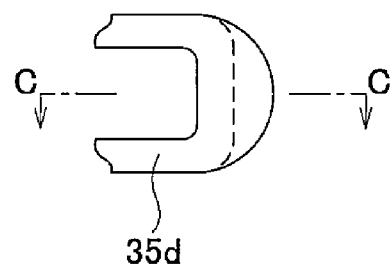
FIG. 15A illustrates a fifth example of the present invention, and is a side view of the end portion of an elastic sleeve.
FIG. 15B is a cross-sectional view of section C-C in FIG. 15A.
Figure 15:
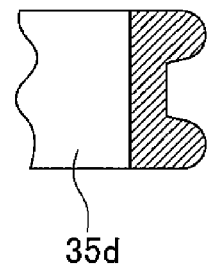

FIGS. 15A and 15B illustrate a fifth example of an embodiment of the present invention. In the construction of this example, the shape of the outer circumferential surface of both end portions in the forward-backward direction of the elastic sleeves 35d is semicircular to correspond to the shape of the inner circumferential surfaces in the end portions of the long holes 25a in the forward-backward direction (see FIG. 13 to FIG. 14B), and in the center portions in the width direction, is shaped so as to be depressed in the front more than the both end portions in the width direction. In the center portion in the width direction, there is a gap between the outer circumferential surface of the end portion of the elastic sleeve 35d and the inner circumferential surface of the end portions of the long hole 25a in the forward-backward direction. With the construction of this example, together with being able to make the rigidity of the front-side impact absorbing portion 44a and rear-side impact absorbing portion 45a (seep FIG. 13) a little higher than in the second or fourth examples of the embodiment, by changing the dimensions in the width direction of the gaps it becomes possible to change the impact absorbing characteristics when the adjustment rod 19a is forcibly caused to displace to the end portions in the forward-backward direction of the long hole 25a in the forward-backward direction. The construction and function of the other parts of this example are the same as in the second and fourth examples of the embodiment. The construction of the gap in the center portion in the width direction can also be applied to the construction of the first and third examples of the embodiment.

SIXTH EXAMPLE

Figure 16:
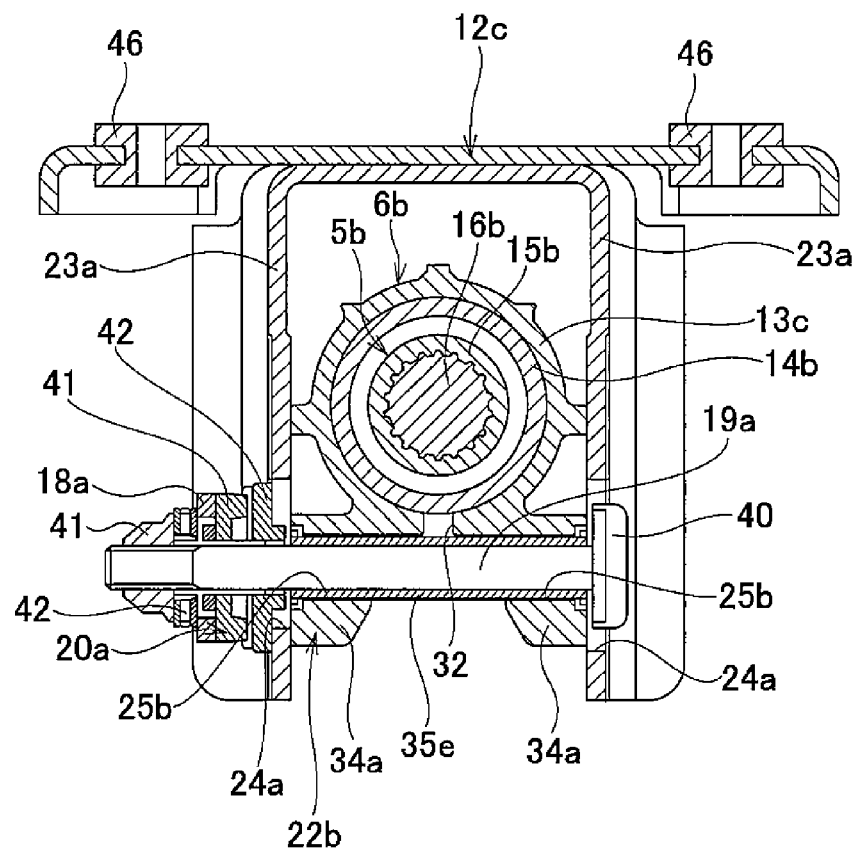
FIG. 16 is a view that corresponds to FIG. 3, and illustrates a sixth example of an embodiment of the present invention.

FIG. 16 illustrates a sixth example of an embodiment of the present invention. In this example, the end portions in the width direction of a single elastic sleeve 35e is fitted inside the pair of long holes 25a in the forward-backward direction that are formed in the pair of left and right held plate portions 34a of the displacement bracket 22b that are integrally provided with the outer column 13b. That is, the elastic sleeve 35e is mounted so as to span between the pair of held plate portions 34a. Moreover, in this example, the portion of the support bracket 12c that is fastened to the vehicle body is supported by way of a pair of left and right locking capsules 46 so as to be able to break away toward the front due to impact energy that is applied during a secondary collision. The breakaway mechanism that uses a locking capsule 46 is conventionally known, so an explanation is omitted here. The construction and function of other parts of this example are the same as in the first example of the embodiment.

SEVENTH EXAMPLE

Figure 17:
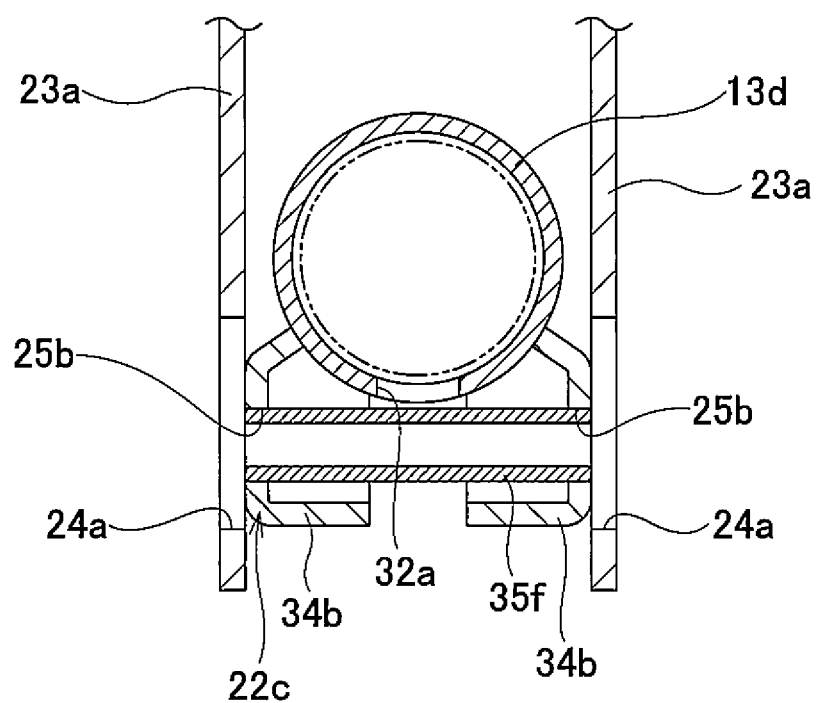
FIG. 17 is a view that corresponds to FIG. 3, and illustrates a seventh example of an embodiment of the present invention.

FIG. 17 illustrates a seventh example of an embodiment of the present invention. In this example, a pair of held plate portions 34b of a displacement bracket 22c are welded and fastened to the bottom surface of the outer column 13d in a state so as to be located on both the left and right sides of a slit 32a in the axial direction that is formed in the outer column 13c. Both end portion in the width direction of a single elastic sleeve 35f are fitted inside the long holes 25b in the forward-backward direction that are formed in portions of the pair of held plate portions 34b that aligned with each other, and this elastic member 35f spans between the held plate portions 34b. However, in this example, there are restrictions due to the plate thickness of the held plate portions 34b, so it is difficult to arbitrarily adjust the contact surface area between the inner circumferential area of the long holes 25b in the forward-backward direction and the outer circumferential area of the elastic sleeve 35f. The construction and functions of other parts of this example are the same as in the sixth example of an embodiment.

It is not within the technical scope of the present invention, however it is possible to provide an impact absorbing mechanism such that impact absorbing members made of elastic material are mounted on the inside of both end portions in the forward-backward direction of the long holes in the forward-backward direction, and that together with preventing direct collision between the outer circumferential surface of the adjustment rod and the inner circumferential surfaces of the end portions of the long holes in the forward-backward direction, absorb impact energy by the impact absorbing members elastically deforming. Furthermore, it is possible to improve the impact absorbing performance of the impact absorbing mechanism that is provided in the end portion on the side where the adjustment rod is located when the entire length of the steering column is completely contracted more than the impact absorbing performance of the impact absorbing mechanism that is provided in the end portion on the side where the adjustment rod is located when the entire length of the steering column is completely expanded.

EXPLANATION OF REFERENCE NUMBERS

1 Steering wheel
2 Steering gear unit
3 Input shaft
4 Tie rod
5, 5a, 5b Steering shaft
6, 6a, 6b Steering column
7 Universal joint
8 Intermediate shaft
9 Universal joint
10 Vehicle body
11 Pivot shaft
12, 12a, 12b, 12c Support bracket
13, 13a to 13d Outer column
14, 14a, 14b Inner column
15, 15a, 15b Outer shaft
16, 16a, 16b Inner shaft
17 Electric motor
18, 18a Adjustment handle
19, 19a Adjustment rod
20, 20a Cam apparatus
21 Cam member
22, 22a, 22b, 22c Displacement bracket
23, 23a Support plate portion
24, 24a Long hole in the up-down direction
25, 25a, 25b Long hole in the forward-backward direction
26a, 26b Sleeve
27 Vehicle body-side fastening bracket
28 Locking notch
29 Top plate portion
30 Restraining bracket
31 Restraining plate portion
32, 32a Slit in the axial direction
33 Slit in the circumferential direction
34, 34a, 34b Held plate portions
35, 35a to 35f Elastic sleeve
36, 36a Gap
37 Concave portion
38 Head portion
39 Nut
40 Thrust bearing
41 Driving cam
42 Driven cam
43, 43a, 43b Flat plate section
44, 44a Front-side impact absorbing portion
45, 45a Rear-side impact absorbing portion
46 Locking capsule

What is claimed is:

1. A telescopic steering apparatus, comprising:
a cylindrical steering column comprising an outer column, an inner diameter of at least one end portion in an axial direction of the steering column being able to expand or contract, and an inner column fitted inside and supported by an inner diameter side of the outer column so as to be able to displace in the axial direction, the steering column being constructed so as to be able to extend and contract;
a displacement bracket fastened to one column of the outer column and the inner column that is located on a rear side, being displaced in the axial direction together with the one column as a steering wheel is moved forward or backward, and comprising a pair of held plate selections that have outside surfaces and a pair of long holes in a forward-backward direction that are formed in the held plate sections respectively and extend in the axial direction of the one column and have inner circumferential surfaces;
a pair of elastic sleeves respectively mounted inside the long holes in the forward-backward direction;
a steering shaft supported on an inner diameter side of the steering column so as to be able to rotate freely, the steering shaft having a portion that protrudes toward the rear side further than an opening on the rear side of the steering column, the steering wheel being fastened to the protruding portion;
a support bracket supporting the steering column with respect to a vehicle body such that forward-backward position of the steering wheel can be adjusted, and comprising a pair of support plate portions that are located on respective sides in a width direction of the displacement bracket and that have outside surfaces, and a pair of through holes formed in parts of the support plate portions that are aligned with each other;
an adjustment rod inserted in the width direction of the displacement bracket through the through holes and the elastic sleeves;
a pair of pressure portions provided on respective end portions of the adjustment rod and facing the respective outside surfaces of the support plate portions; and
an expansion and contraction mechanism expanding or contracting a space between inside surfaces of the support plate portions by expanding or contracting a space between the pressure portions,
wherein the inner circumferential surfaces of the long holes in the forward-backward direction have stepped shaped sections such that opening areas of the long holes in the forward-backward direction become narrower going from the outside surfaces of the held plate sections toward inside in the width direction.

2. The telescopic steering apparatus according to claim 1, wherein
the long holes in the forward-backward direction and the elastic sleeves respectively have both forward-backward end portions, and gaps are provided between the inner circumferential surfaces of the long holes in the forward-backward direction and outer circumferential surfaces of the elastic sleeves, at least at one end portions of the forward-backward end portions where the adjustment rod is located with an entire length of the steering column completely contracted in order to move the forward-backward position of the steering wheel to a most forward adjustable position, the gaps functioning to reduce an impact that is applied to the adjustment rod from the inner circumferential surfaces of the one end portions of the long holes in the forward-backward direction by increasing an amount of elastic deformation of the elastic sleeves when the adjustment rod forcibly collides with the inner circumferential surfaces of the one end portions of the elastic sleeves.

3. The telescopic steering apparatus according to claim 2, wherein
the outer column is located on the rear side, the inner column is located on a front side, and the one column is the outer column;
a slit that extends in the axial direction is formed in a front end portion of the outer column such that the inner diameter of the outer column can elastically expand and contract;
the held plate portions are fastened to an outer circumferential surface of the outer column on both sides of the slit;
the one end portions of the long holes in the forward-backward direction and the elastic sleeves are rear end portions of the long holes in the forward-backward direction and the elastic sleeves; and
the gaps are provided at least between the inner circumferential surfaces of the rear end portions of the long holes in the forward-backward direction and the outer circumferential surfaces of the rear end portions of the elastic sleeves.

4. The telescopic steering apparatus according to claim 2, wherein
a shape of each of the inner circumferential surfaces of the one end portions of the long holes in the forward-backward direction is a semicircular shape having a fixed radius of curvature;
a shape of each of the outer circumferential surfaces of the one end portions of the elastic sleeves is such that center sections of the outer circumferential surfaces have a radius of curvature that is less than the radius of curvature of the semicircular shape, and portions on both sides of the center sections have an arcuate shape having a radius of curvature greater than the radius of curvature of the semicircular shape; and
the gaps are provided in portions on both sides of the center sections between the inner circumferential surfaces of the one end portions of the long holes in the forward-backward direction, and the outer circumferential surface of the one end portions of the elastic sleeves.

5. The telescopic steering apparatus according to claim 2, wherein
a shape of each of the inner circumferential surfaces of the one end portions of the long holes in the forward-backward direction is a semicircular shape having a fixed radius of curvature;
a shape of each of the outer circumferential surfaces of the one end portions of the elastic sleeves comprises a flat plate section formed in a center of each of the outer circumferential surfaces and curved plate sections on both sides of the flat plate section; and
the gaps are provided in the portions that respectively correspond to the flat plate section between the inner circumferential surfaces of the one end portions of the long holes in the forward-backward direction, and the outer circumferential surfaces of the one end portions of the elastic sleeves.

6. The telescopic steering apparatus according to claim 2, wherein
on the both forward-backward end portions of the long holes in the forward-backward direction and the elastic sleeves, the gaps are provided between the inner circumferential surfaces of the long holes in the forward-backward direction and the outer circumferential surfaces of the elastic sleeves.

7. The telescopic steering apparatus according to claim 1, wherein
the elastic sleeves have both forward-backward end portions, and one end portions of the both end portions in the forward-backward direction of the elastic sleeves, where the adjustment rod is located with an entire length of the steering column completely contracted in order to move the forward-backward position of the steering wheel to a most forward adjustable position, has an impact absorbing performance higher than another end portions of the both end Portions in the forward-backward direction where the adjustment rod is located with the entire length of the steering column completely expanded.

8. The telescopic steering apparatus according to claim 7, wherein
the one end portions of the both end portions in the forward-backward direction of the elastic sleeves have a thickness dimension in the forward-backward direction greater than the thickness dimension in the forward-backward direction of the another end portions.

* * * * *